(12) United States Patent
Patchett

(10) Patent No.: US 7,901,236 B2
(45) Date of Patent: Mar. 8, 2011

(54) TELECOMMUNICATION PATCH PANEL

(75) Inventor: Leonard James Patchett, Berkeley Vale (AU)

(73) Assignee: ADC GmbH, Berlin (DE)

( * ) Notice: Subject to any disclaimer, the term of this patent is extended or adjusted under 35 U.S.C. 154(b) by 55 days.

(21) Appl. No.: 12/130,183

(22) Filed: May 30, 2008

(65) Prior Publication Data

US 2009/0068881 A1 Mar. 12, 2009

(30) Foreign Application Priority Data

Sep. 6, 2007 (AU) ................................ 2007904848

(51) Int. Cl.
*H01R 13/627* (2006.01)
(52) U.S. Cl. ........................................................ 439/354
(58) Field of Classification Search ................. 439/354, 439/353, 713, 49, 540.1
See application file for complete search history.

(56) References Cited

U.S. PATENT DOCUMENTS

| 4,460,234 A | 7/1984 | Bogese |
| 5,639,261 A | 6/1997 | Ruthkowski et al. |
| 6,358,093 B1 | 3/2002 | Phommachanh et al. |
| 6,424,781 B1 | 7/2002 | Puetz et al. |
| 6,504,726 B1 * | 1/2003 | Grabinger et al. ............ 361/796 |
| 6,537,106 B1 * | 3/2003 | Follingstad .................... 439/534 |
| 6,916,199 B2 | 7/2005 | Follingstad |
| 7,179,119 B2 | 2/2007 | Follingstad |
| 7,244,144 B2 | 7/2007 | Follingstad |
| 7,300,307 B2 * | 11/2007 | Murr et al. .................. 439/540.1 |
| 7,335,056 B1 | 2/2008 | Clark et al. |
| 7,357,667 B2 | 4/2008 | Clark et al. |
| 7,548,434 B2 | 6/2009 | Busse et al. |
| 2006/0228940 A1 | 10/2006 | Follingstad |
| 2008/0009182 A1 | 1/2008 | Follingstad |
| 2008/0096438 A1 | 4/2008 | Clark et al. |

FOREIGN PATENT DOCUMENTS

| GB | 2 420 665 | 5/2006 |
| WO | WO 99/63628 | 12/1999 |
| WO | WO 2005/107275 | 11/2005 |

OTHER PUBLICATIONS

Singapore Written Opinion mailed Aug. 27, 2009 for Singapore patent application No. 200804445-5, which claims the benefit of the same priority application, AU 2007/904848, (17 pages).

* cited by examiner

*Primary Examiner* — Phuong K Dinh
(74) *Attorney, Agent, or Firm* — Merchant & Gould P.C.

(57) ABSTRACT

A telecommunications patch panel, including a frame member including a plurality of connector module mounts; and a plurality of connector modules, each being coupled to one of said mounts in one of a plurality of positions about an axis of rotation, wherein a first side of each connector module of said modules includes a plurality first of connector jacks in electrical communication with a second connector jack coupled to an opposite facing second side of the module.

30 Claims, 25 Drawing Sheets

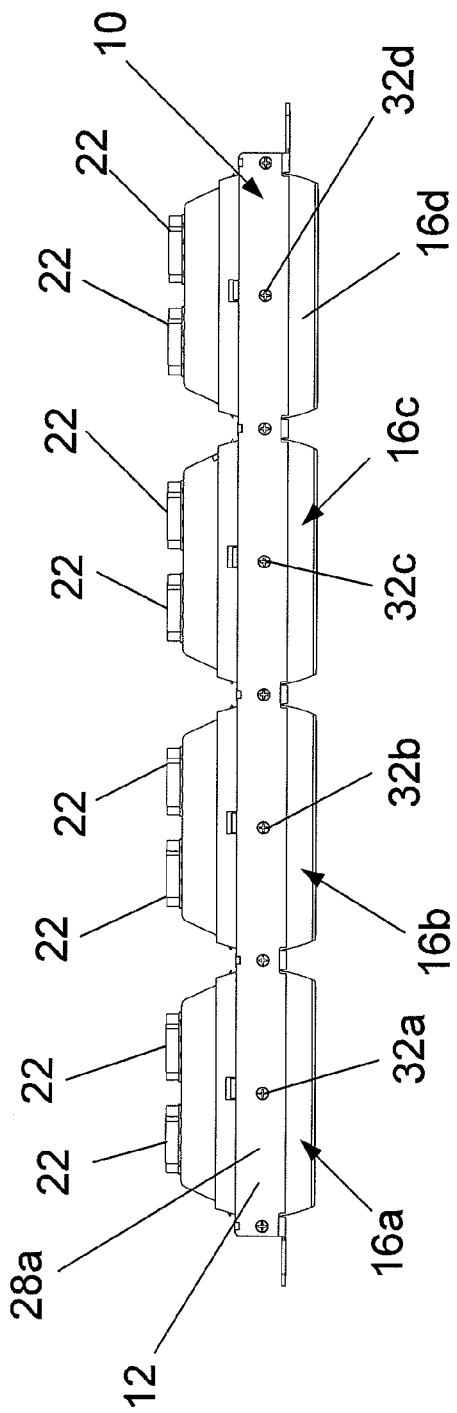
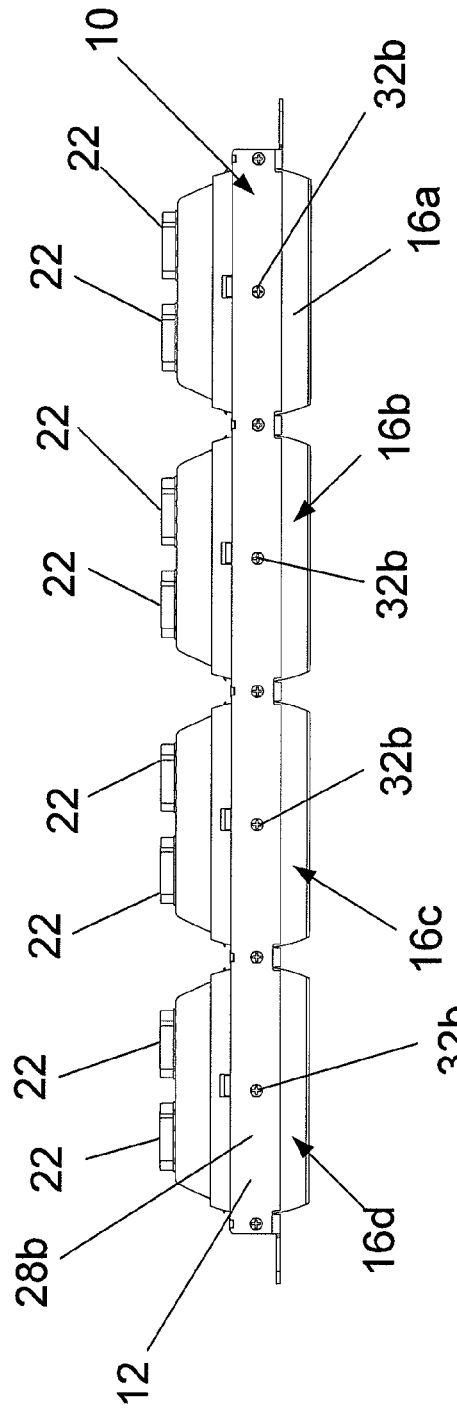

140
TELECOMMUNICATION PATCH PANEL

TECHNICAL FIELD OF THE INVENTION

The present invention relates to a telecommunications patch panel.

BACKGROUND OF THE INVENTION

Local area networks and telecommunications connections often use patch panels, especially at the customer's premises to enable cross-connection between telecommunications equipment. Patch panels typically include front and rear connection locations. The rear connections are typically a more permanent type of connection, such as insulation displacement connectors to connect to copper based, twisted pair telecommunications cable. The front connections of the patch panel may include any of a variety of jacks for receipt of a plug of a patch cord or other transmission cable. The jack and plug allows fairly rapid connection and disconnection between two jacks in the same patch panel, or between one jack in the patch panel and another jack in a nearby patch panel, with the patch cord. One type of jack and plug arrangement for a patch panel is an RJ45 type connector. U.S. Pat. No. 5,639,261 discloses an example of a cross-connect panel including rear insulation displacement connectors, and front connector jacks for receiving plugs of patch cords.

There is an increasing need for cable management in order to protect and organize the various cables. One area where damage and/or loss of performance may occur with copper based, twisted pair cables is when excessive bending of the cable occurs. This is especially a concern as higher frequencies are used, such as category 5 and greater. Falling below minimum bend radii of the cables can adversely affect performance with the transmission of signals through the copper wire patch cords. Therefore, there is a need for patch panels which address the cable management concerns noted above.

Routers can include both RJ45 and MINI RJ21 connectors. Some existing equipment may only be compatible for communication with routers having RJ45 connectors. In such circumstances, it may be difficult or generally inconvenient to establish communications between the relevant equipment and the router.

In a communications installations, it may be necessary to relay a plurality of data cables through a roof space between two pieces of equipment. It may be time consuming and generally inconvenient to install each cable in the roof space individually.

It is generally desirable to overcome or ameliorate one or more of the above mentioned difficulties, or at least provide a useful alternative.

SUMMARY OF THE INVENTION

In accordance with one aspect of the invention, there is provided, a telecommunications patch panel, including:
(a) a frame member including a plurality of connector module mounts; and
(b) a plurality of connector modules, each being coupled to one of said mounts in one of a plurality of positions about an axis of rotation,
wherein a first side of each connector module of said modules includes a plurality of first of connector jacks in electrical communication with a second connector jack coupled to an opposite facing second side of the module.

Preferably, the plurality of first connector jacks of each connector module is a linear array of RJ45 connector jacks.

Preferably, the second connector jack of each connector module is a MINI RJ21 connector jack.

Preferably, the plurality of first connector jacks of each connector module is electrically connected to the second connector jack by electric contacts of a printed circuit board.

Preferably, the printed circuit board includes four layers.

BRIEF DESCRIPTION OF THE DRAWINGS

Preferred embodiments of the present invention are hereafter described, by way of non-limiting example only, with reference to the accompanying drawing in which:

FIG. 3 is a top view of the patch panel shown in FIG. 1;
FIG. 4 is a bottom view of the patch panel shown in FIG. 1.

DETAILED DESCRIPTION OF PREFERRED EMBODIMENTS OF THE INVENTION

Figure 1:
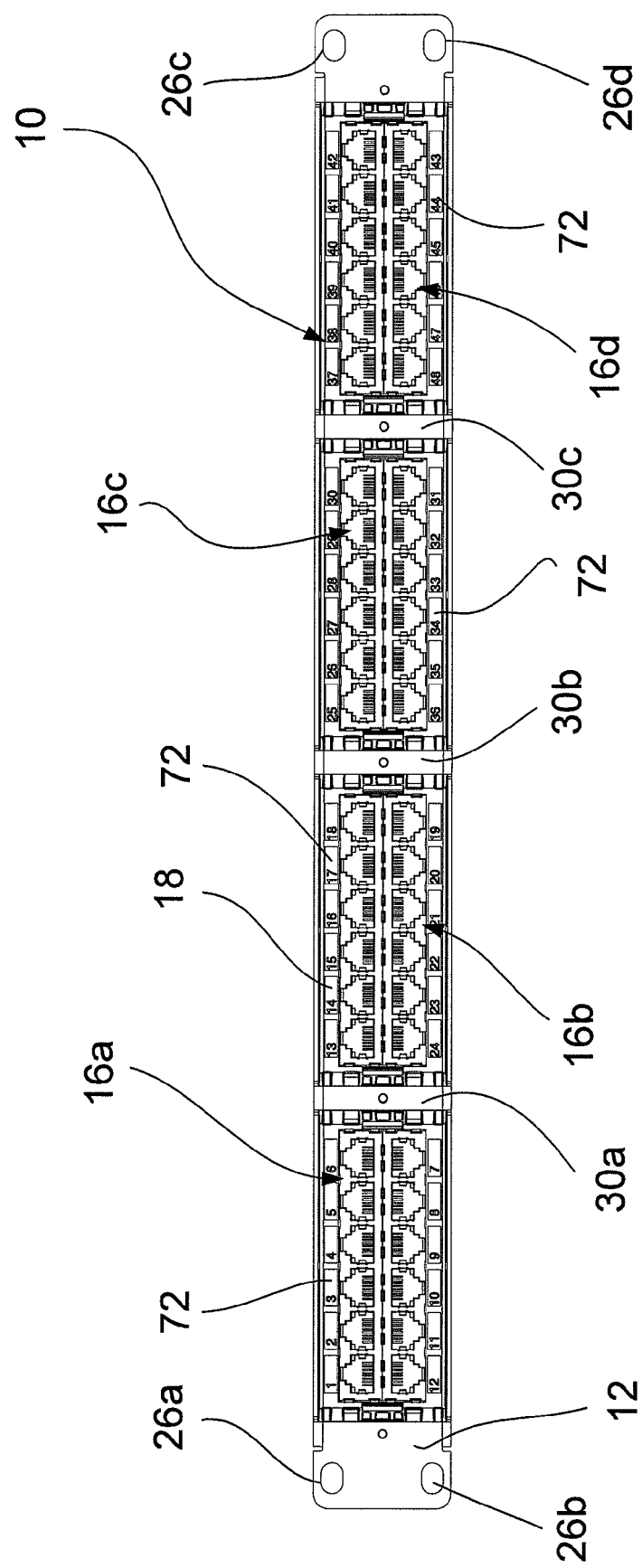
FIG. 1 is a front view of a telecommunications patch panel.
Figure 2:
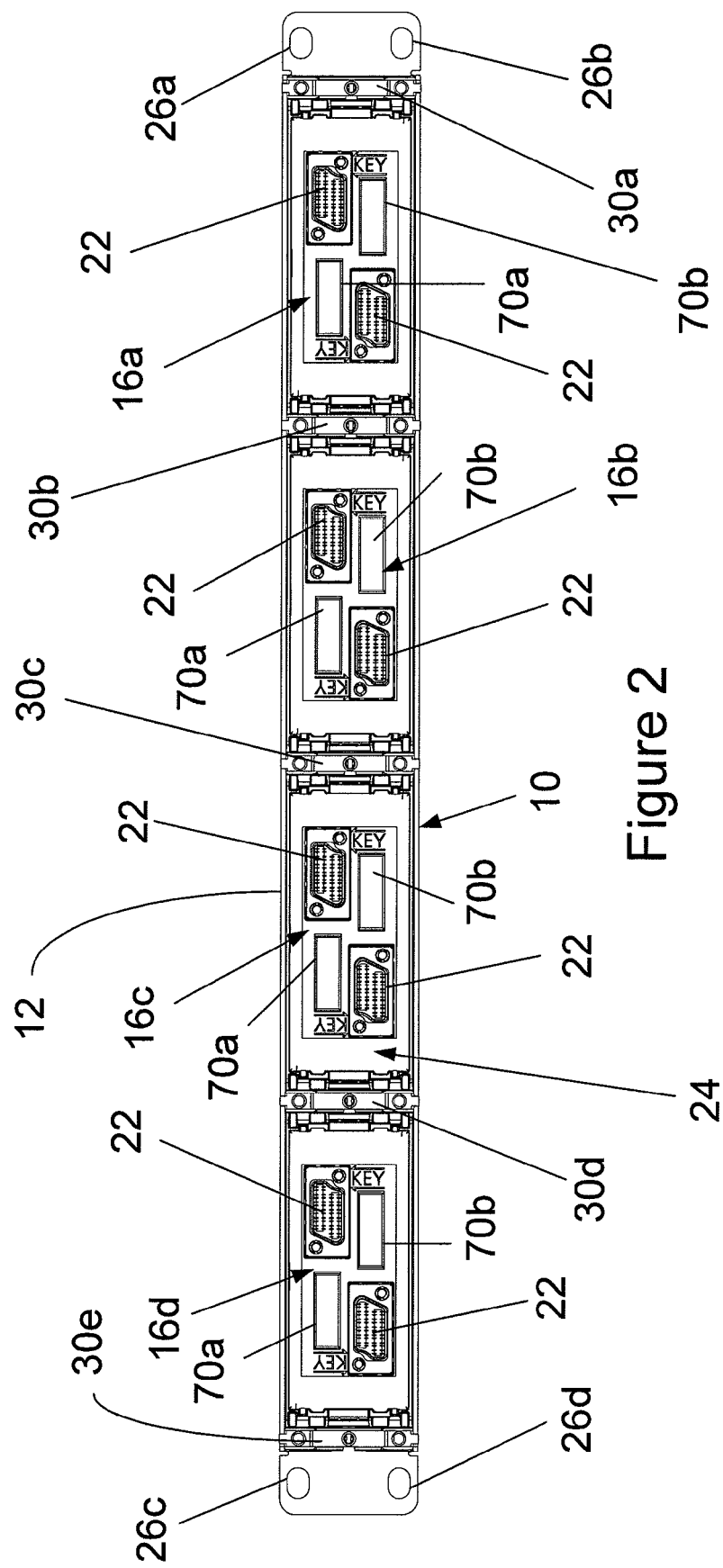
FIG. 2 is a back view of the patch panel shown in FIG. 1.
Figure 5:
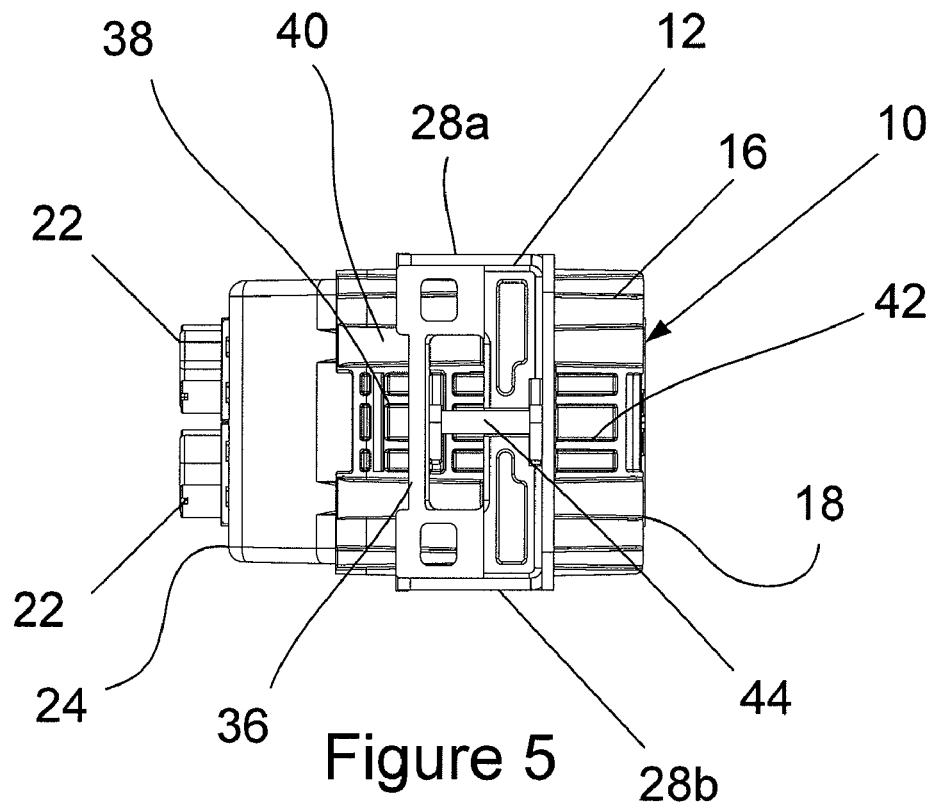
FIG. 5 is a side view of the patch panel shown in FIG. 1.
Figure 6:
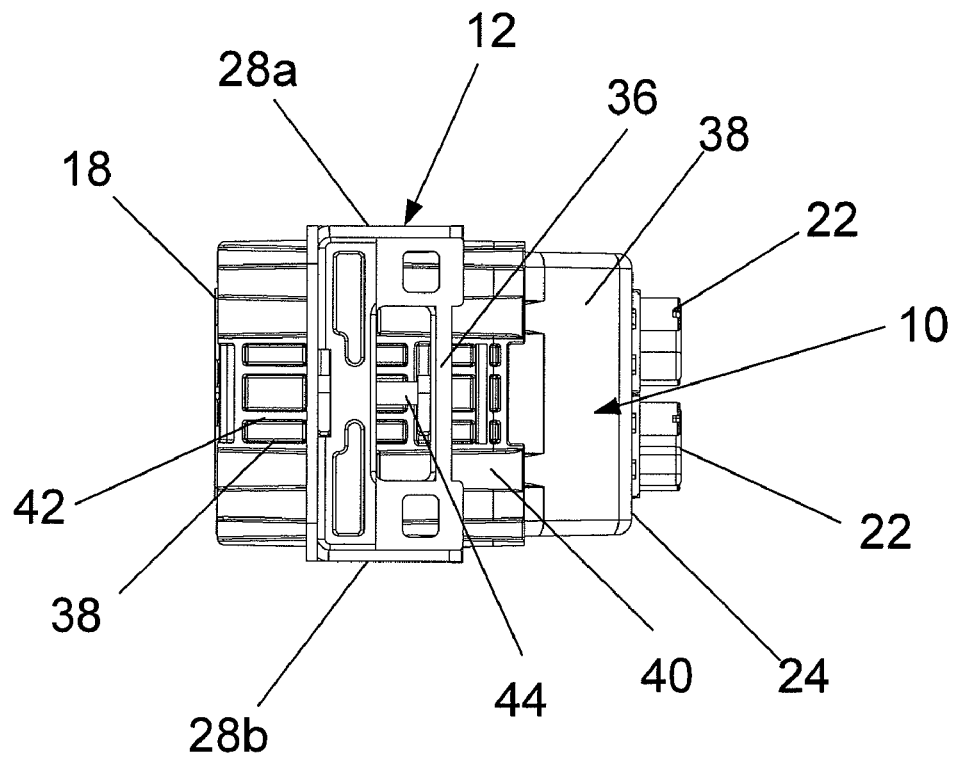
FIG. 6 is another side view of the patch panel shown in FIG. 1.

The telecommunications patch panel 10 shown in FIGS. 1 to 11 includes a frame member 12 including a plurality of connector module mounts 14; and a plurality of connector modules 16, each being coupled to one of the mounts 14 in one of a plurality of positions about an axis of rotation. A first side 18 of each connector module 16 includes a plurality of first connector jacks 20 in electrical communication with a second connector jack 22 coupled to an opposite facing second side 24 of the connector module 16. The plurality of first connector jacks 20 of each connector module 16 is a linear array of RJ45 connector jacks. The second connector jack 22 of each connector module 16 is an MINI RJ21 connector jack.

The telecommunications patch panel 10 can be used to connect telecommunications equipment. The patch panel 10 is especially useful in cross-connecting equipment. For example, the patch panel 10 can be used to connect equipment having an RJ45 connector jack to a router having an MINI RJ21 connector jack. In communications installations where it is necessary to relay a plurality of data cables through a roof space between two pieces of equipment, the patch panel 10 can be used to combine data cables extending from a plurality of RJ45 connectors jacks into one data cable extending from a MINI RJ21 data cable. In doing so, it is only necessary to run one data cable through the roof cavity.

The frame member 12 is adapted to be mounted to a rack (not shown) of conventional construction. For example, the frame member 12 includes four apertures 26a, 26b, 26c, 26d through which fasteners (not shown) can be passed for receipt in holes (not shown) of the rack.

Figure 10:
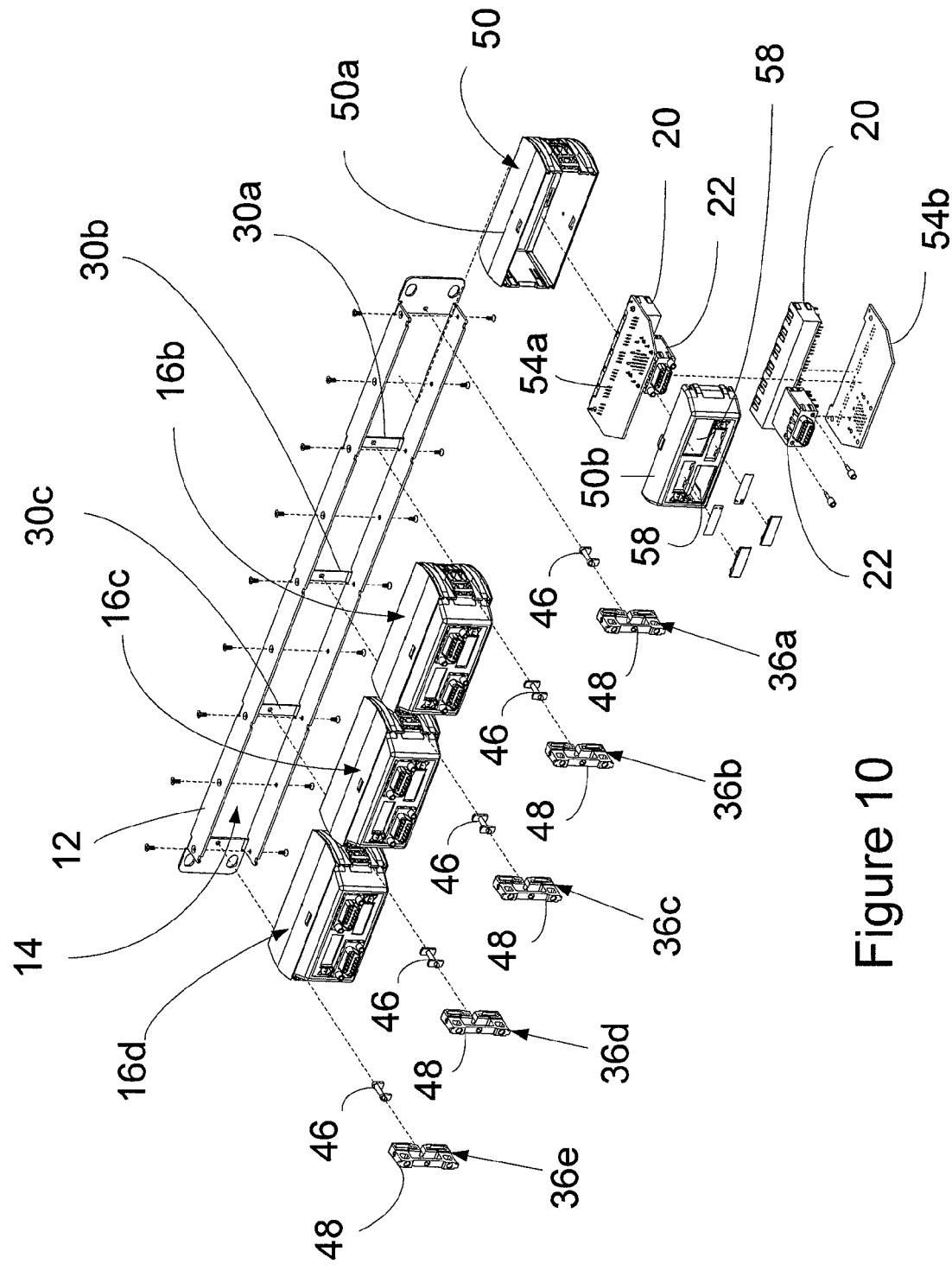
FIG. 10 is a partially exploded back perspective view of the patch panel shown in FIG. 1.
Figure 11:
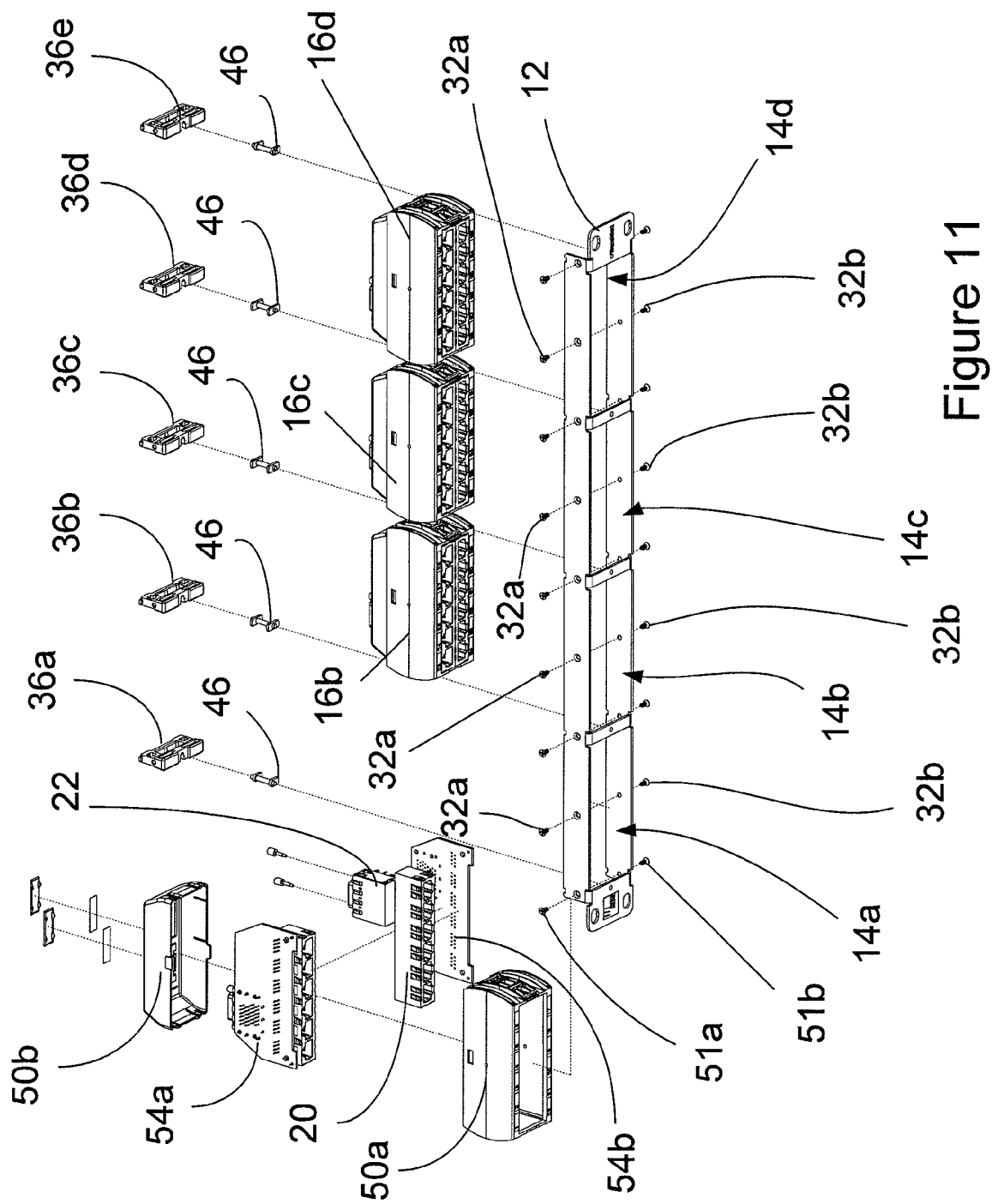
FIG. 11 is a partially exploded front perspective view of the patch panel shown in FIG. 1.

As particularly shown in FIGS. 10 and 11, the frame member 12 includes an upper elongate plate 28a and a lower elongate plate 28b arranged in parallel and separated by dividers 30a, 30b, 30c. The frame member is preferably formed of one piece of metal that has been pressed into shape so that the dividers 30a, 30b, 30c are connected integrally with common sides of the upper and lowers plates 28a, 28b. Each connector module mount 14a, 14b, 14c, 14d is formed between the upper and lower plates 28a, 28b and adjacent dividers 30a, 30b, 30c of the frame member 12. The connector module mounts 14a, 14b, 14c, 14d are of suitable size and shape to receive connector modules 16a, 16b, 16c, 16d in positions such that body portions of the module 16a, 16b, 16c, 16d are seated between the upper and lower plates 28a, 28b. The modules 16a, 16b, 16c, 16d are coupled to the mounts 14a, 14b, 14c, 14d by pins 32a, 32b extending through opposite sides of the upper and lower plates 28a, 28b. The pins 32a, 32b engage each module 16a, 16b, 16c, 16d in a manner that facilitates at least partial rotation about an axis defined therebetween. Alternatively, each connector module 16a, 16b, 16c, 16d is coupled to its respective mount 14a, 14b, 14c, 14d by any other suitable means that permits them to be arranged in a number of different positions about an axis of rotation.

Figure 7:
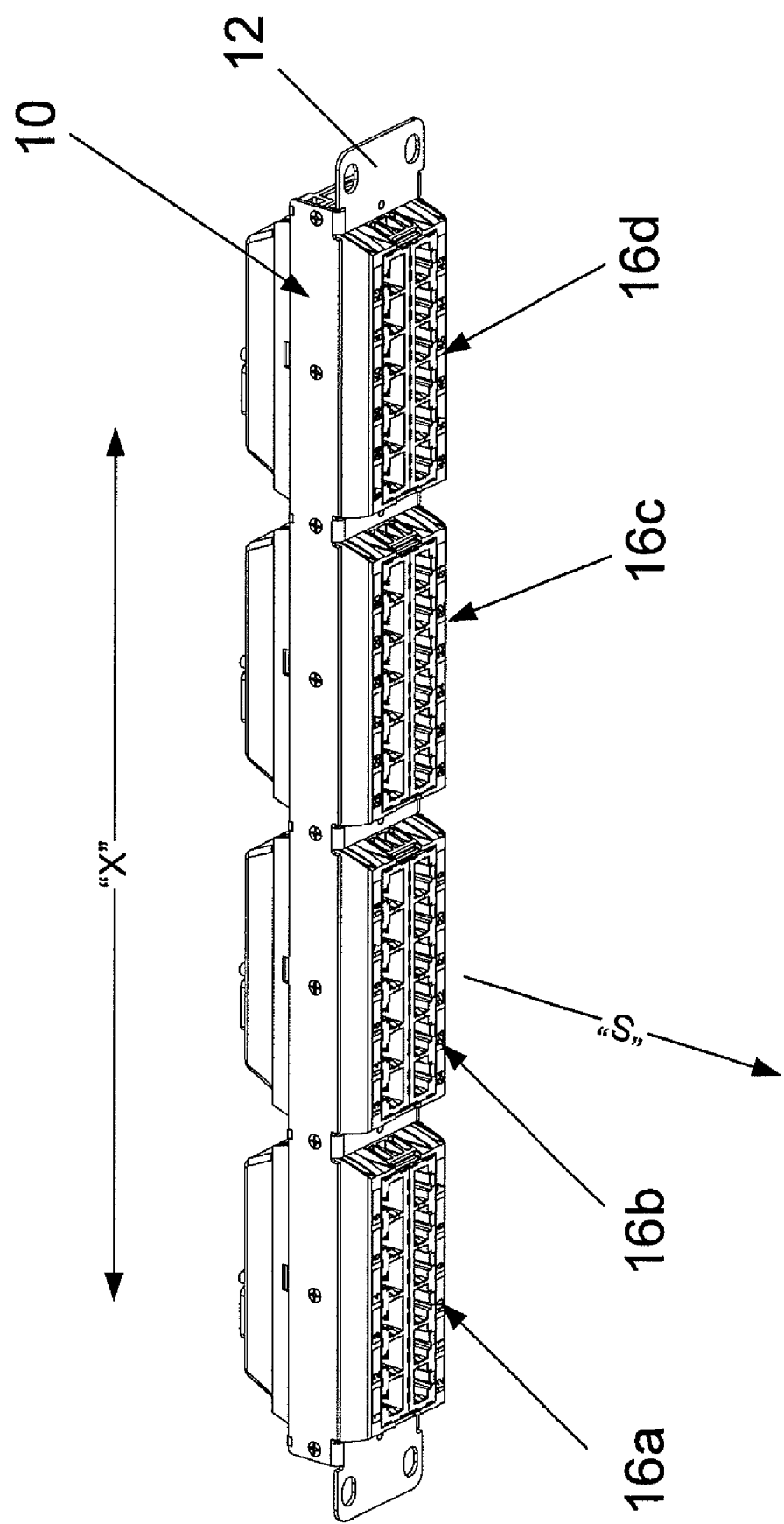
FIG. 7 is a front perspective view of the patch panel shown in FIG. 1.
Figure 8:
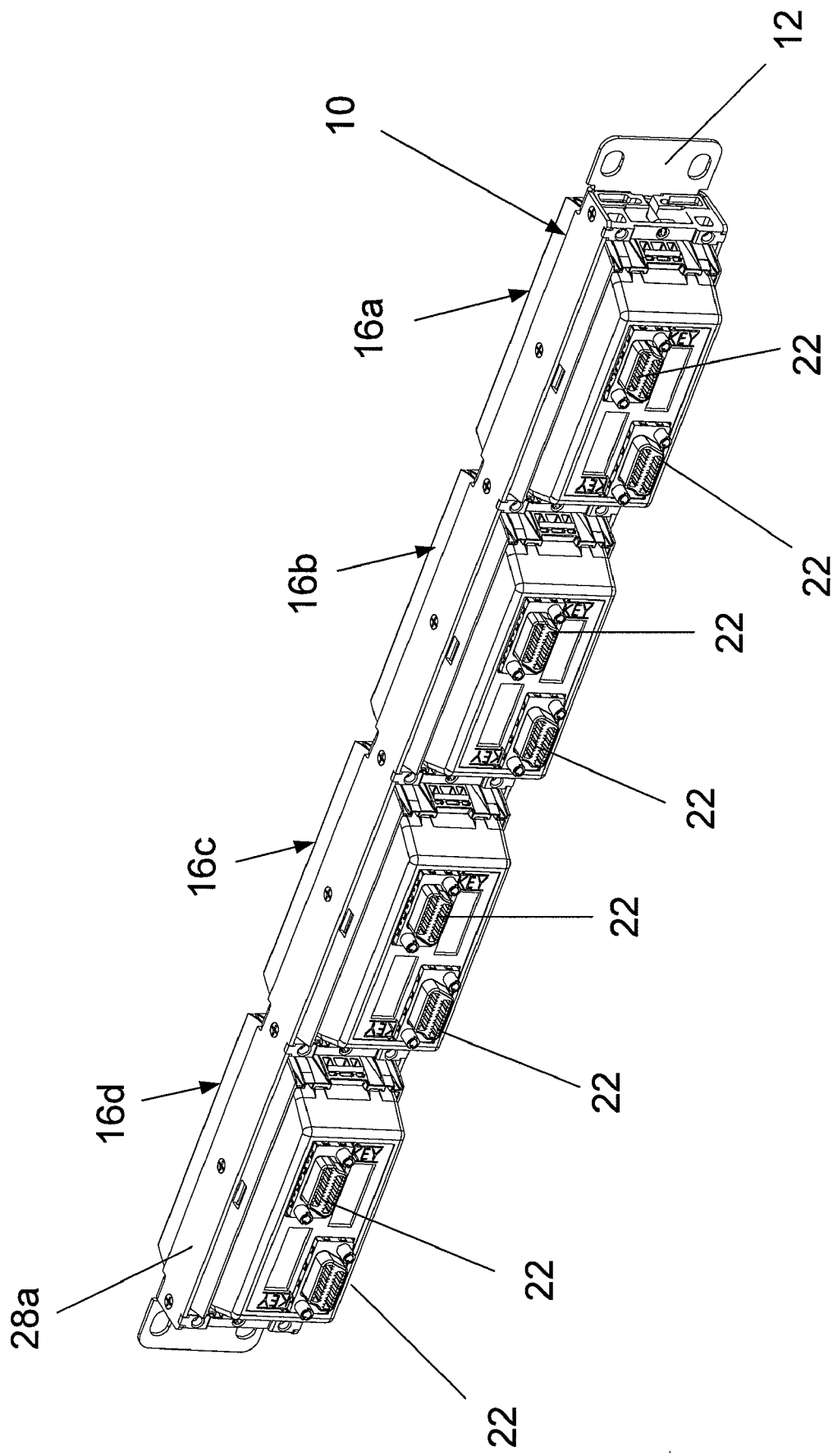
FIG. 8 is a back perspective view of the patch panel shown in FIG. 1.
Figure 9:
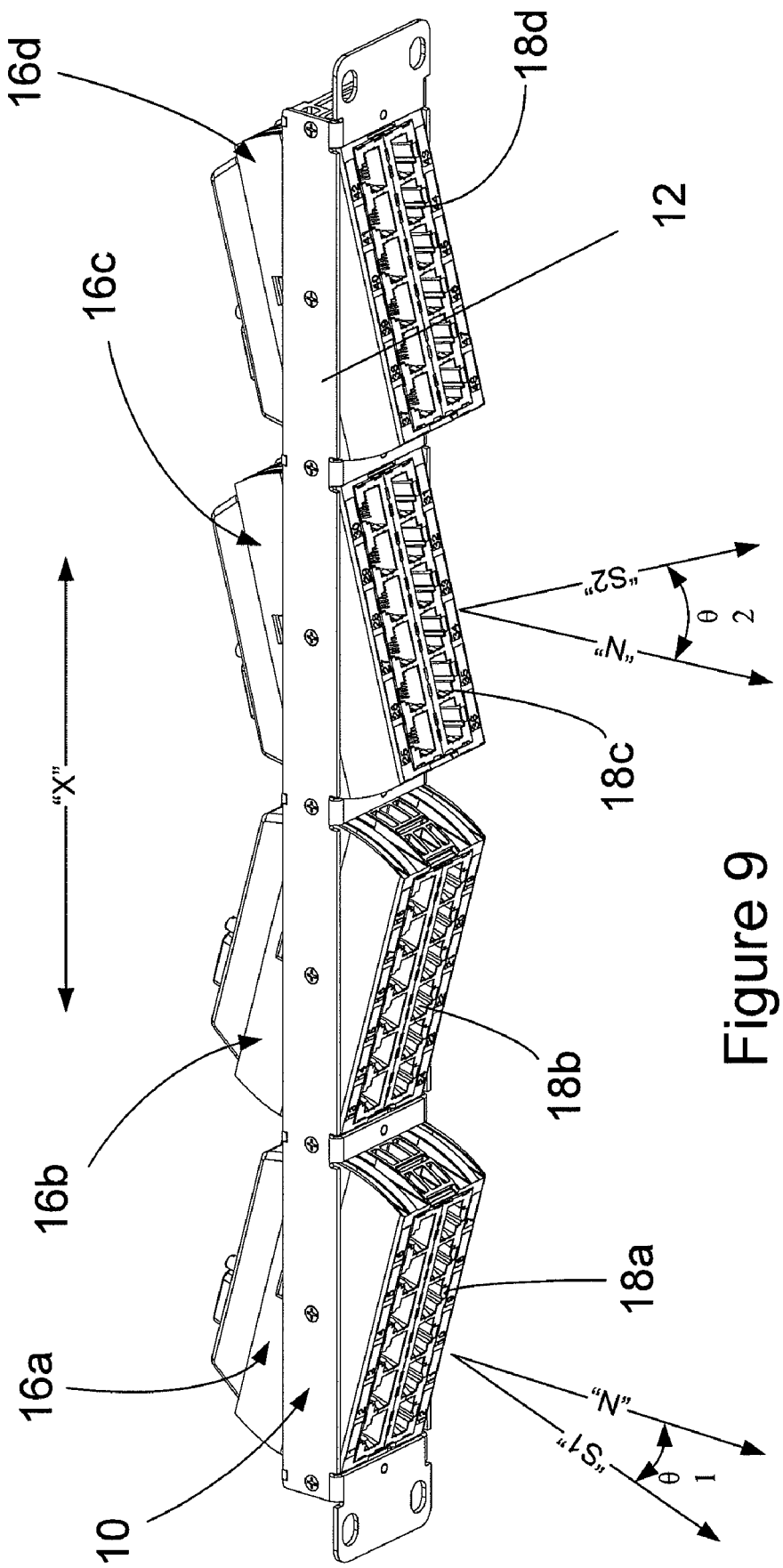
FIG. 9 is a front perspective view of the patch panel shown in FIG. 1 arranged in another condition of use.

In the above-described arrangement, each module 16a, 16b, 16c, 16d can be arranged in the manner shown in FIG. 7, where the first side 18 is opens in a direction "S" normal to a direction of extent "X" of the frame member 12. The modules 16a, 16b, 16c, 16d can also be arranged like the first module 16a shown in FIG. 9, where the first side 18a is opens in a direction "$S_1$" that is $\theta_1$ degrees to a direction "N" normal to the direction of extent "X" of the frame member 12. $\theta_1$ is preferably fifteen degrees, for example. Similarly, modules 16a, 16b, 16c, 16d can also be arranged like the third module 16c shown in FIG. 9 so the first side 18c is opens in a direction "S2" that is $\theta_2$ degrees to a direction "N" normal to the direction of extent "X" of the frame member 12. $\theta_2$ is preferably fifteen degrees, for example.

The angle of the modules 16a, 16b, 16c, 16d with respect to the direction of extent "X" of the frame member 12 provides strain relief so as to help prevent cable damage and/or loss of cable performance. The cable positioning provided by the angled connector modules 16a, 16b, 16c, 16d helps reduce the likelihood of falling below the minimum bend radius of the cable as each cable travels to other jacks or other equipment. Such strain relief is advantageous over a perpendicular mounting of the connector plug relative to the cable pathway.

As particularly shown in FIGS. 10 and 11, the patch panel 10 includes five locking devices 36a, 36b, 36c, 36d, 36e which are adapted to hold secure the connector modules 16a, 16b, 16c, 16d in fixed positions with respect to their axes of rotation. Each locking device 36a, 36b, 36c, 36d, 36e is adapted to be fastened to a divider 30a, 30b, 30c or an end section of the frame member 12. As particularly shown in FIGS. 5 and 6, the locking devices 36a, 36b, 36c, 36d, 36e are shaped to receive and engage locking surfaces 38 of side sections 40 of the connector modules 16a, 16b, 16c, 16d. Each locking surface 38 includes vertical and horizontal channels 42 shaped to receive a flange 44 of the locking device 36.

To position the modules 16a, 16b, 16c, 16c in a preferred arrangement, the following steps are performed:
1. Unscrew the locking devices 36a, 36b, 36c, 36d, 36e from their current position;
2. Rotate modules 16a, 16b, 16c, 16d about respective axes to desired positions;
3. Screw locking devices back into position 36a, 36b, 36c, 36d, 36e ensuring that the flanges 44 are seated in the corresponding channels 42 of the modules 16a, 16b, 16c, 16d.

The modules 16a, 16b, 16c, 16c are held in position by way of frictional engagement between the channels 42 and the flanges 44 of the locking devices 36a, 36b, 36c, 36d, 36e. As such, the arrangement of the horizontal and vertical channels 42 determines the permissible positions of rotation about the axes. Alternatively, the locking devices 36a, 36b, 36c, 36d, 36e are adapted to engage the modules 16a, 16b, 16c, 16d in any suitable manner that facilitates securing them in fixed positions of rotation about their axes.

The locking devices 36a, 36b, 36c, 36d, 36e include locking pins 46, and brackets 48 mountable to the frame 12. Each locking pin 46 includes a shaft, two spaced apart tabs a first tool engageable end, and an opposite end. Each tab has two ends extending in opposite directions. One of the ends is received in hole of a corresponding divider 30a, 30b, 30c. Tool engageable end is received in an aperture of the bracket 48. Bracket 48 is mounted to upper and lower plates 28a, 28b of the frame 12 with two fasteners 51a, 51b. Once brackets 48 are mounted to frame 12, locking pin 46 is rotatable between an unlocked position, and a locked position. The unlocked position is where shaft is rotated 90 degrees about its longitudinal axis, such as with a flathead screwdriver received in tool engageable end. Examples of locking devices 36a, 36b, 36c, 36d, 36e can be found, for example, in U.S. Pat. No. 7,244,144.

The patch panel 10 is useable in both cross-connect systems, and in inter-connect systems, as desired. Providing strain relief so as to not fall below minimum bend radii is also an issue with fiberoptic transmission cables. The telecommunications patch panel 10 of the present invention is also useful in fiber applications with appropriately configured fiberoptic connectors.

Figure 12:
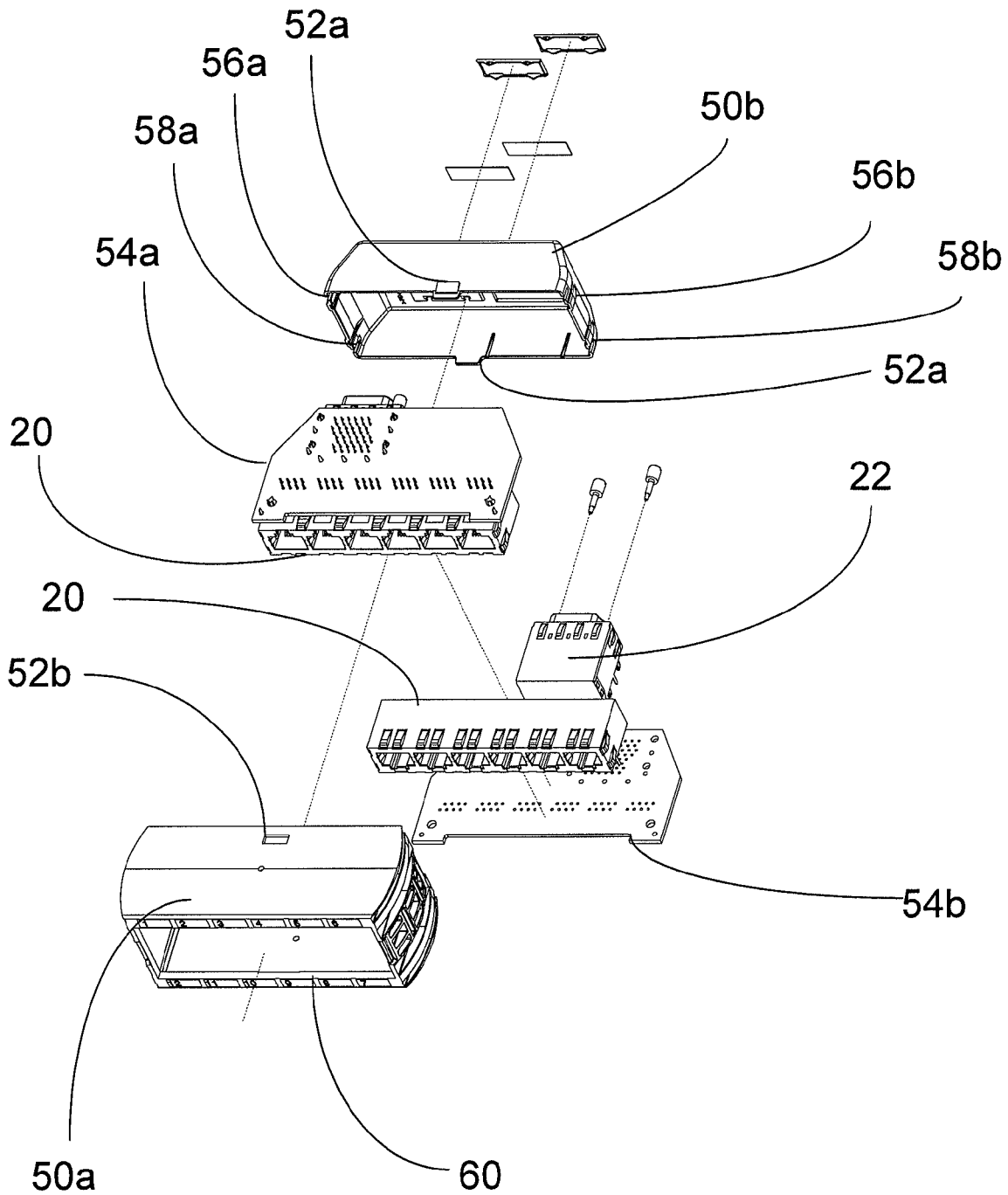
FIG. 12 is an exploded view of a connector module of the patch panel shown in FIG. 1.

As particularly shown in FIG. 12, each connector module 16 includes a housing 50, formed in first and second parts 50a, 50b coupled together by male and female snap lock clips 52a, 52b. The housing 50 encapsulates two printed circuit boards 54a, 54b each having a plurality of RJ45 connector jacks 20 and a MINI RJ21 connector jack 22 electrically coupled thereto. The two printed circuit boards 54a, 54b are preferably identical. As such, only is hereafter described. The RJ45 jacks 20 are arranged as a linear array along an edge of the printed circuit board 54a, 54b. The MINI RJ21 jack 22 is arranged towards a corner of the printed circuit board 54a, 54b, opposite the array of RJ45 jacks 20. The external interface of the MINI RJ21 jack 22 opens in an opposite direction to the external interfaces of the RJ45 jacks 20. Both the RJ45 jacks 20 and the MINI RJ21 jack 22 are arranged on the same side of the printed circuit board 54a, 54b.

The first and second parts 50a, 50b of the housing 50 include top and bottom pairs of channels 56a, 56b and 58a, 56b formed in the internal walls that are shaped to receive side sections of the printed circuit boards 54a, 54b. The pairs of channels 56a, 56b and 58a, 58b act to secure the printed circuit boards 54a, 54b in fixed positions when the parts 50a, 50b of the housing 50 are fitted together. When so arranged, the array of RJ45 connectors 20 of each printed circuit board 54a, 54b are seated for use in the face plate 60 and the MINI RJ21 jacks 22 are seated in corresponding apertures 58 of the second part 54b of the housing 50.

Figure 13:
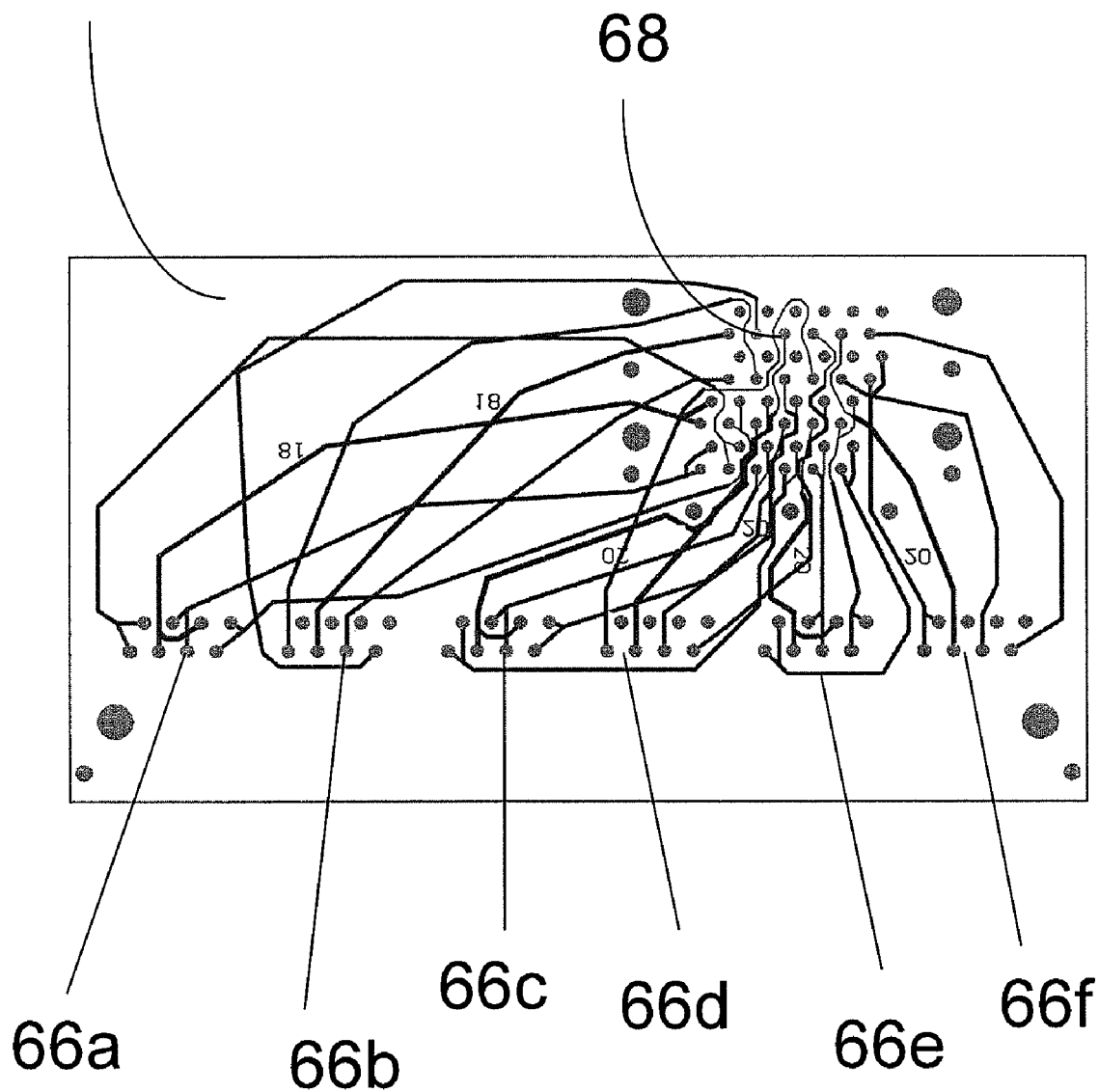
FIG. 13 is a top view of a printed circuit board of a connector module of the patch panel shown in FIG. 1.
Figure 14:
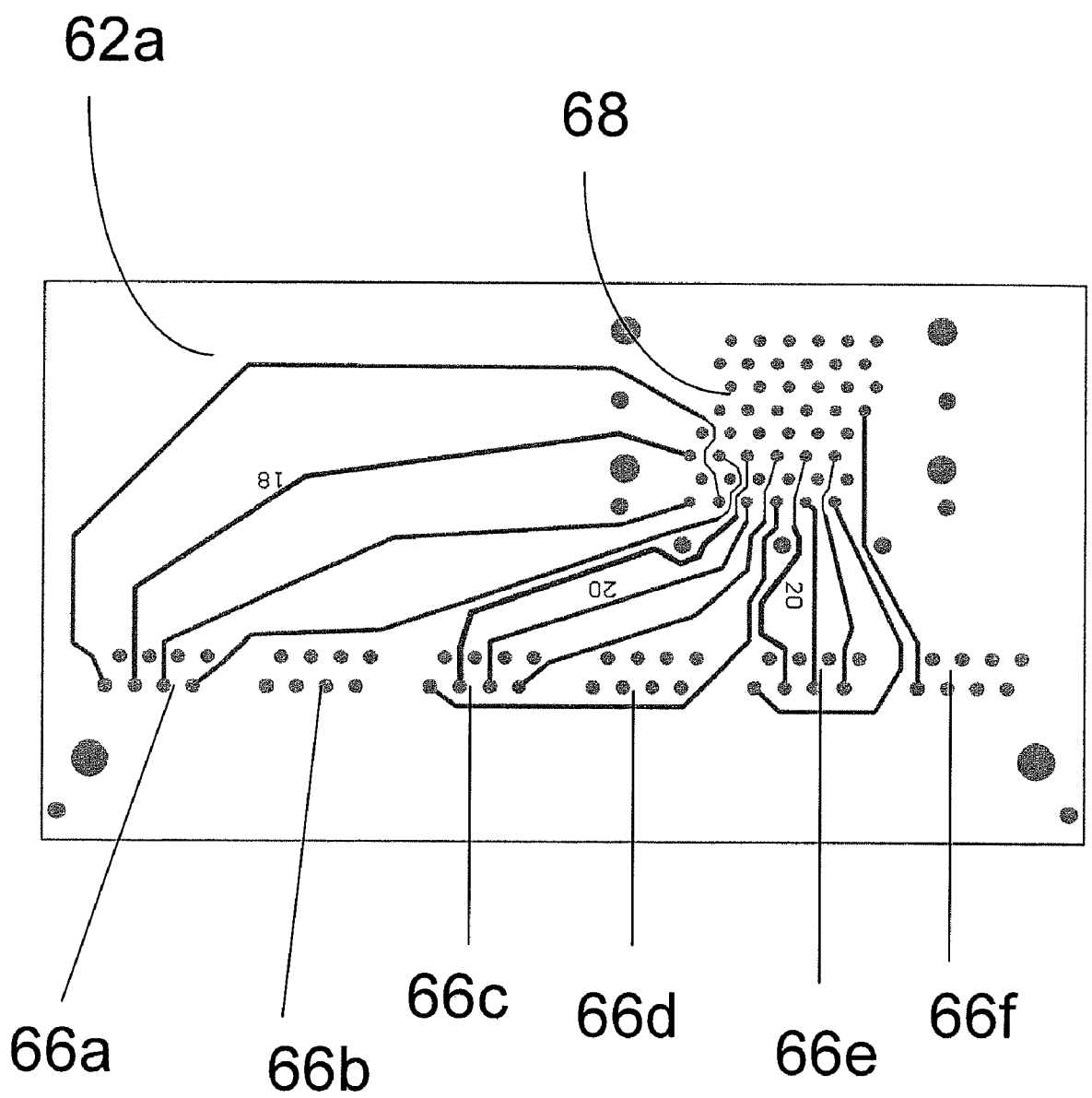
FIG. 14 is a top view of a first layer of the printed circuit board shown in FIG. 13.
Figure 15:
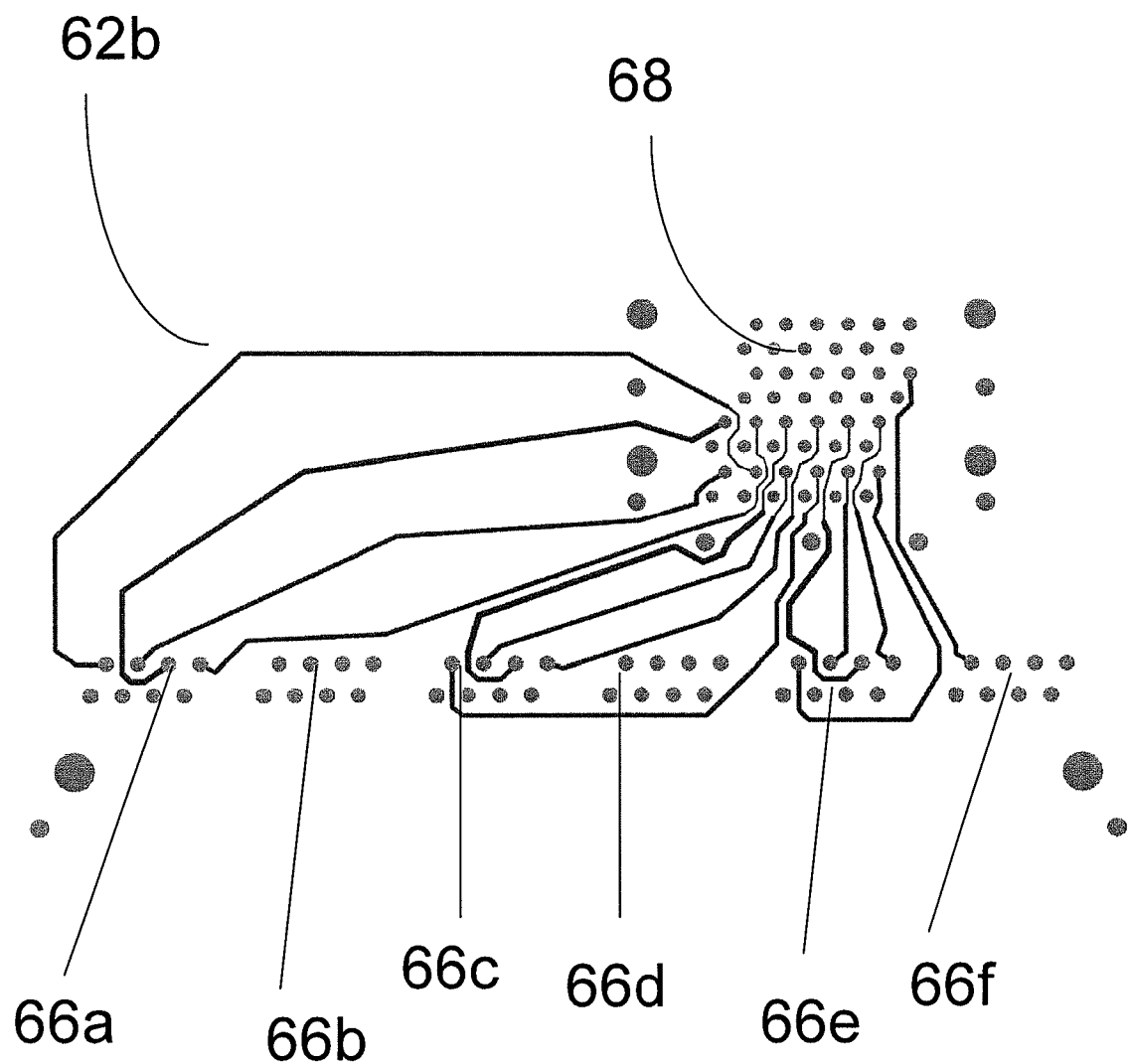
FIG. 15 is a top view of a second layer of the printed circuit board shown in FIG. 13.
Figure 16:
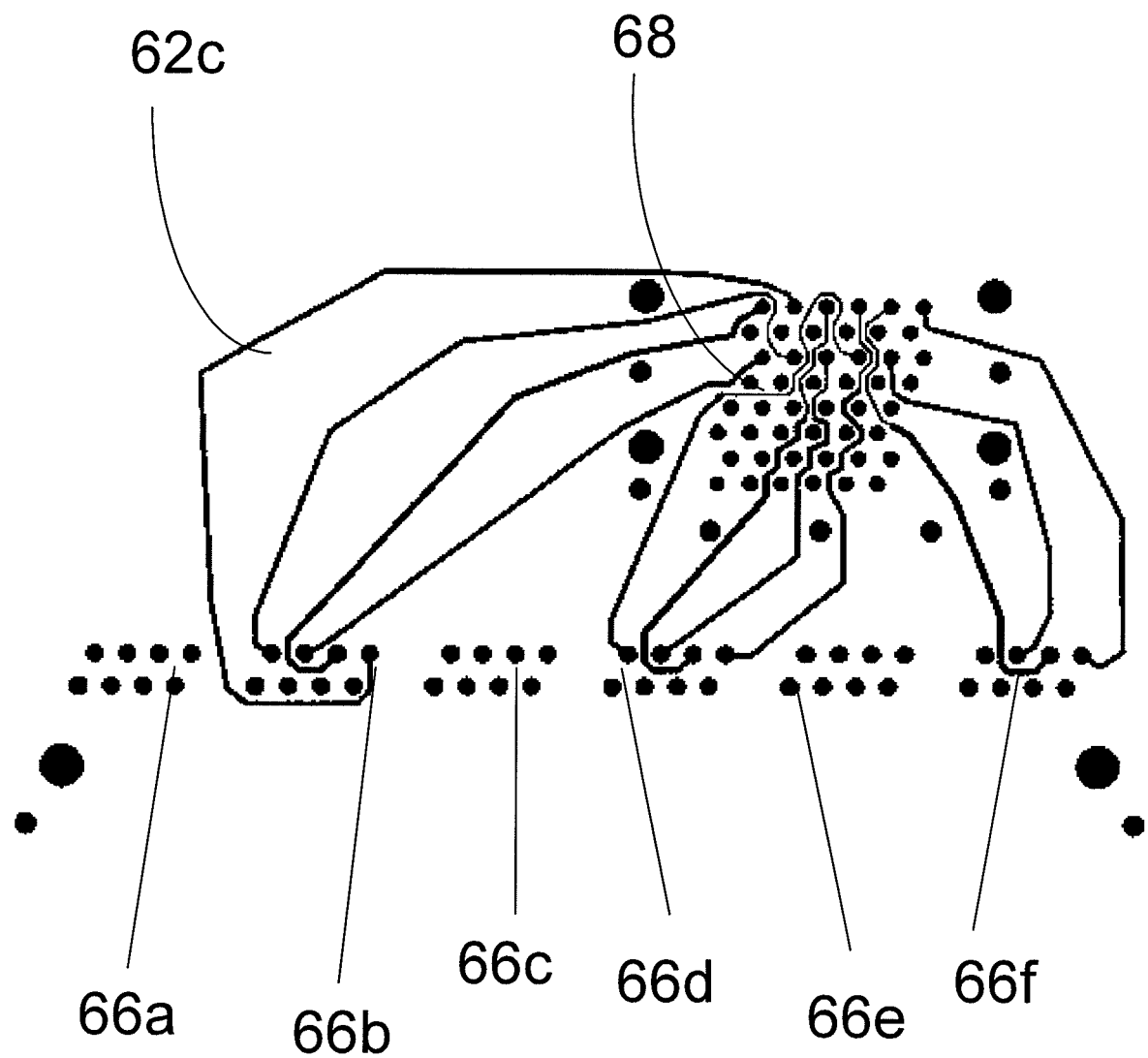
FIG. 16 is a top view of a third layer of the printed circuit board shown in FIG. 13.
Figure 17:
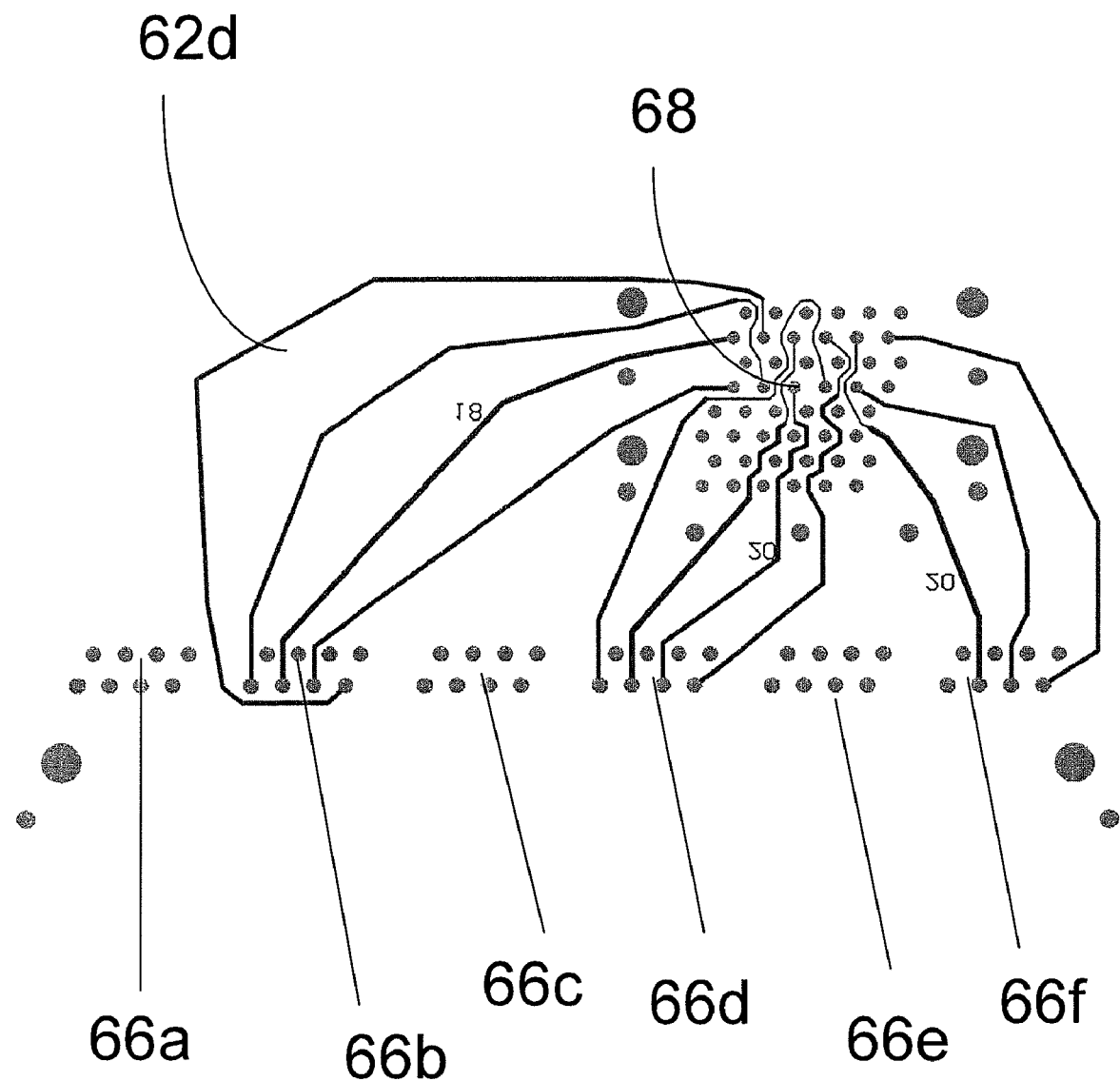
FIG. 17 is a top view of a fourth layer of the printed circuit board shown in FIG. 13
Figure 18:
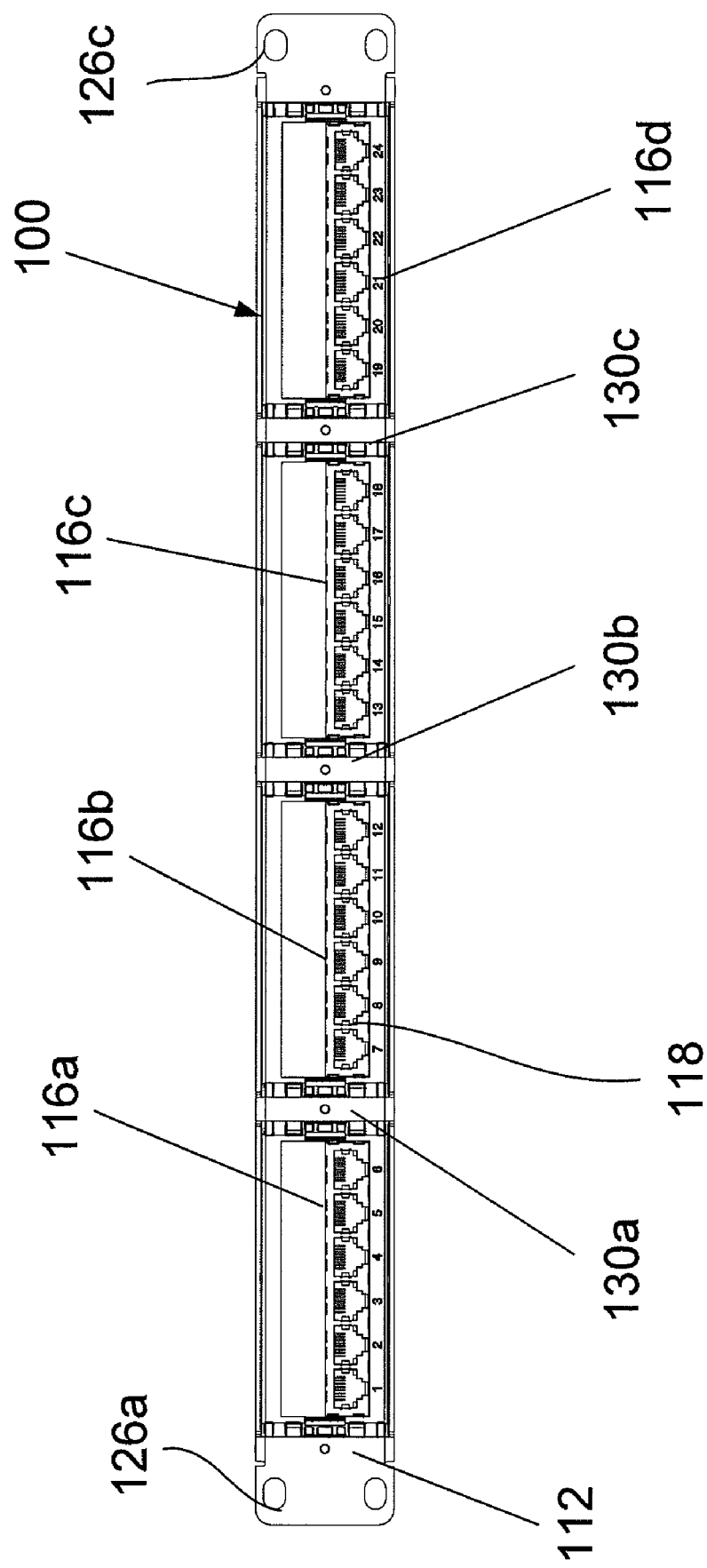
FIG. 18 is a front view of another telecommunications patch panel.
Figure 19:
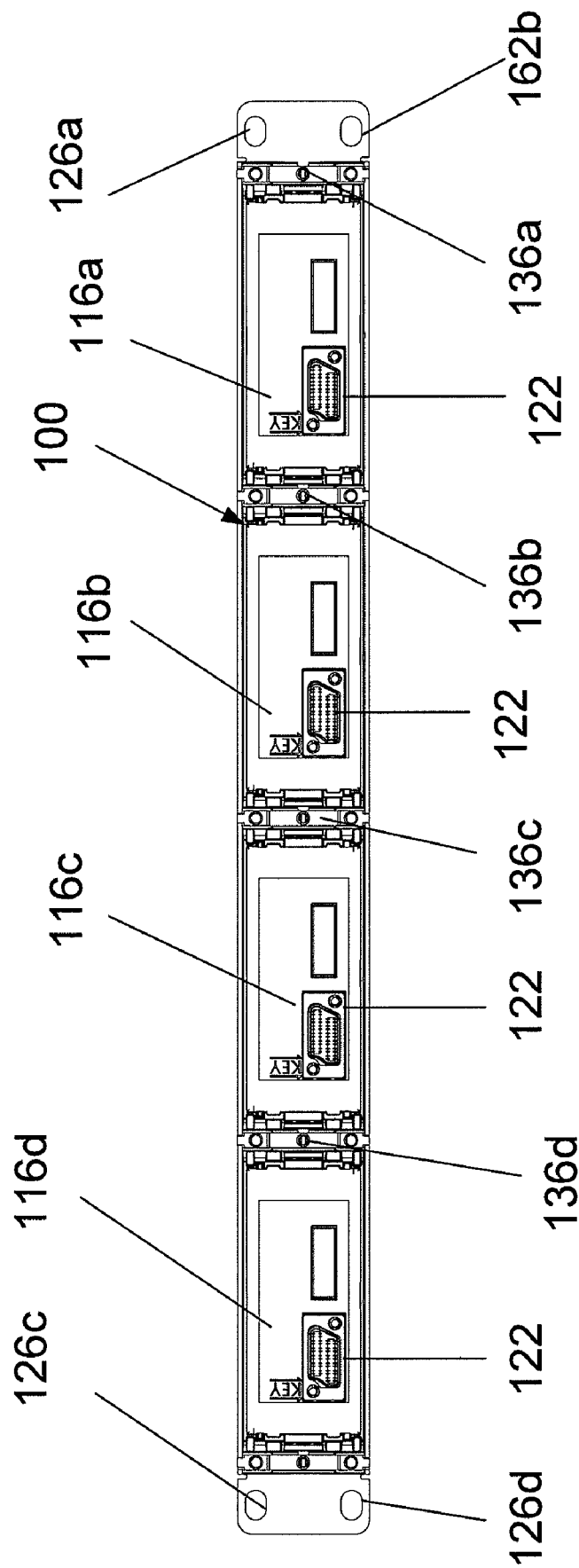
FIG. 19 is a back view of the patch panel shown in FIG. 18.
Figure 20:
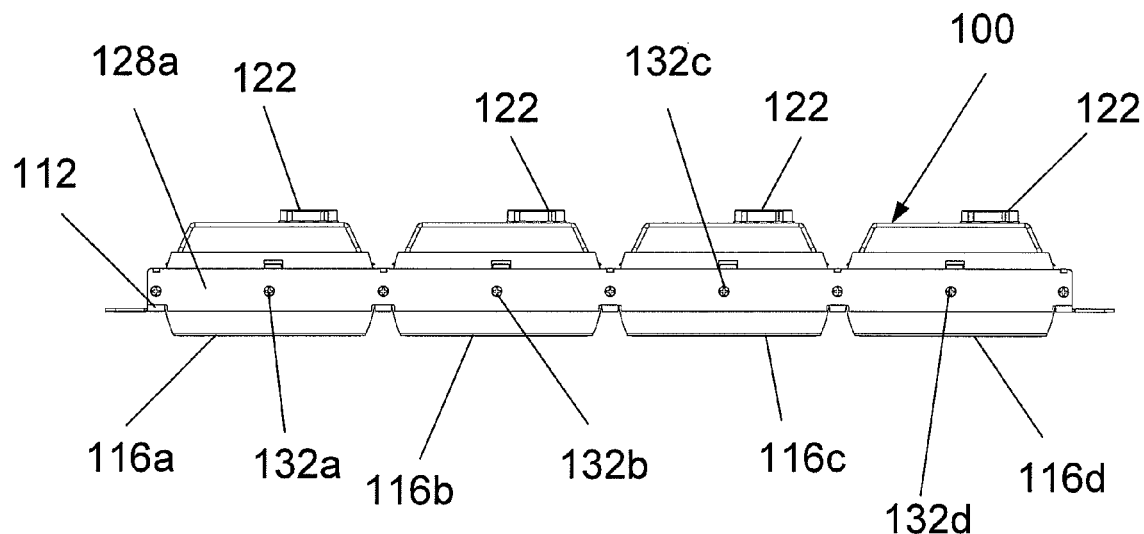
FIG. 20 is a top view of the patch panel shown in FIG. 18.
Figure 21:
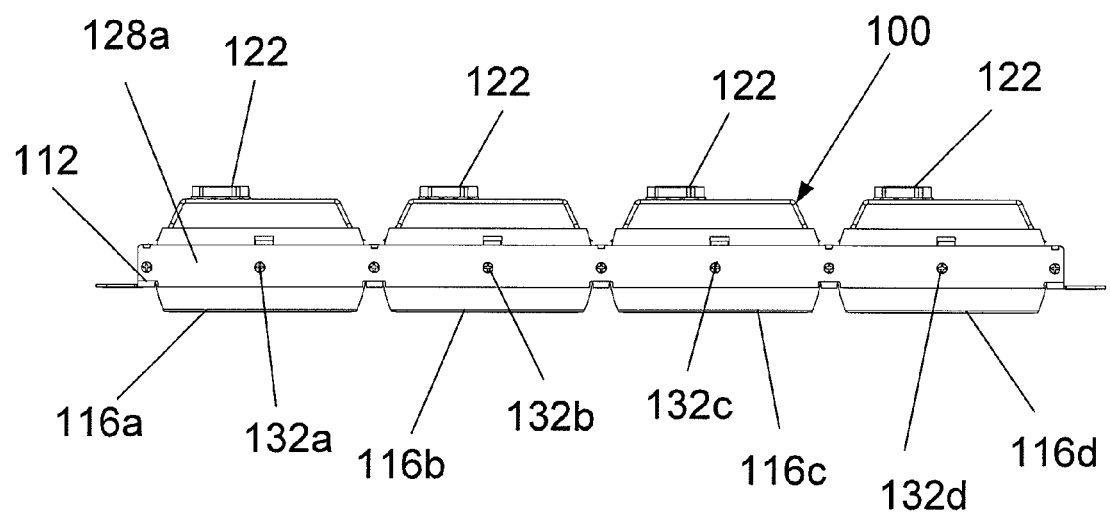
FIG. 21 is a bottom view of the patch panel shown in FIG. 18.
Figure 22:
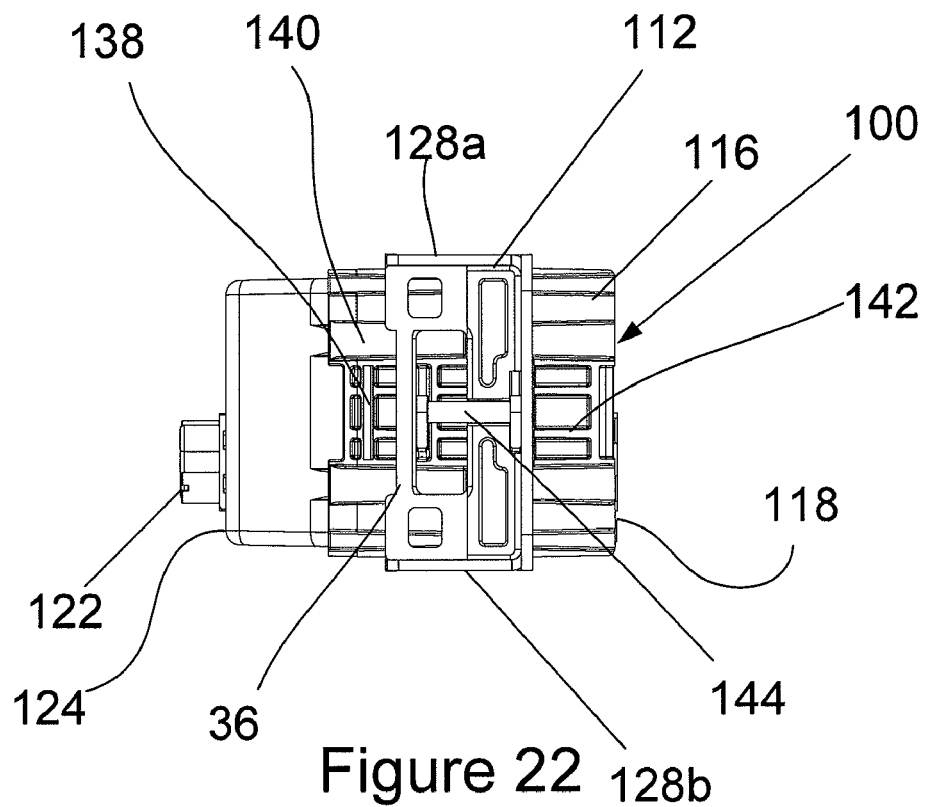
FIG. 22 is a side view of the patch panel shown in FIG. 18.
Figure 23:
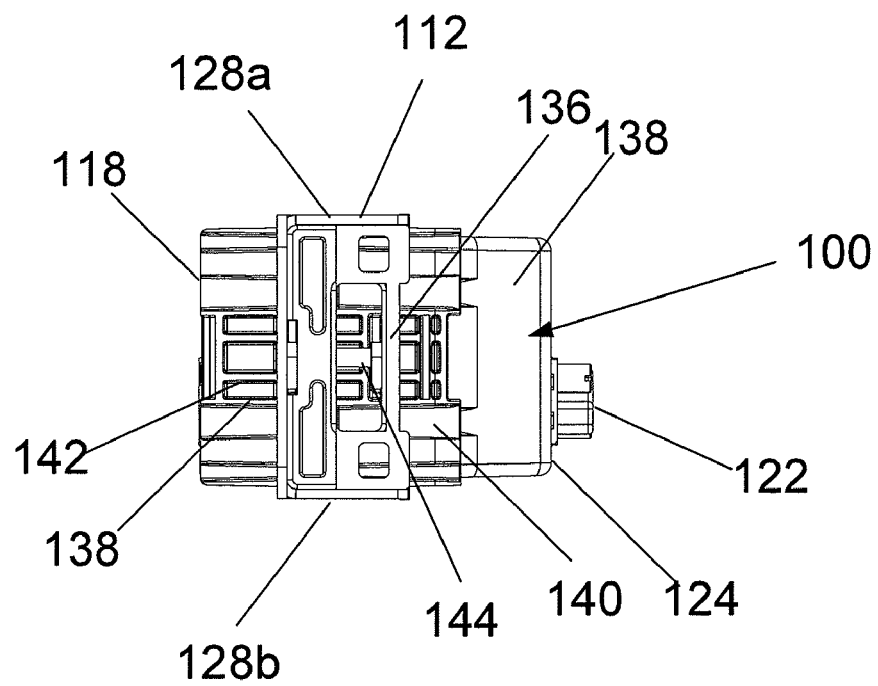
FIG. 23 is another side view of the patch panel shown in FIG. 18.

The printed circuit board 54a, 54b shown in FIG. 13 includes four layers 62a, 62b, 62c, 62d. The arrangement of the electric contacts of each layer of the printed circuit board 54a, 54b is shown in FIGS. 14 to 17. Each layer 62a, 62b, 62c, 62d of the printed circuit board includes six sets of contacts 66a, 66b, 66c, 66d, 66e, 66f for electrically engaging corresponding contacts of the RJ45 connector jacks 20 and a set of contacts 68 for electrically engaging corresponding contacts of the MINI RJ21 connector jack 22. Each set of contacts 66a, 66b, 66c, 66d, 66e, 66f includes four pairs. Different pairs from the same set are preferably not parallel to reduce crosstalk. Each track runs on a single layer. As such there is no need for "vias". That is, places where the track switches from layer to another.

The first and second layers 62a, 62b are 0.4 mm apart. Layers two and three 62b, 62c are 0.8 mm apart. Layers three and four 62c, 62d are 0.4 mm apart. The total board thickness is 1.6 mm.

The arrangement of electric contacts compensates for capacitive and inductive coupling in the connector module 16. Compensation is effected by changing the thickness of the tracks.

The second part 50b of the housing includes a label 70a, 70b for each MINI RJ21 jack 22.

The first part 50a of the housing 50 includes labelling 72 for the RJ45 jacks.

The telecommunications patch panel 100 shown in FIGS. 18 to 29 includes a frame member 112 including a plurality of connector module mounts 114; and a plurality of connector modules 116, each being coupled to one of the mounts 114 in one of a plurality of positions about an axis of rotation. A first side 118 of each connector module 116 includes a plurality of first connector jacks 120 in electrical communication with a second connector jack 122 coupled to an opposite facing second side 124 of the connector module 116. The plurality of first connector jacks 120 of each connector module 116 is a linear array of RJ45 connector jacks. The second connector jack 122 of each connector module 116 is an MINI RJ21 connector jack.

The telecommunications patch panel 100 can be used to connect telecommunications equipment. The patch panel 100 is especially useful in cross-connecting equipment. For example, the patch panel 100 can be used to connect equipment having an RJ45 connector jack to a router having an MINI RJ21 connector jack. In communications installations where it is necessary to relay a plurality of data cables through a roof space between two pieces of equipment, the patch panel 100 can be used to combine data cables extending from a plurality of RJ45 connectors jacks into one data cable extending from a MINI RJ21 data cable. In doing so, it is only necessary to run one data cable through the roof cavity.

The frame member 112 is adapted to be mounted to a rack (not shown) of conventional construction. For example, the frame member 112 includes four apertures 126a, 126b, 126c, 126c, 126d through which fasteners (not shown) can be passed for receipt in holes (not shown) of the rack.

Figure 28:
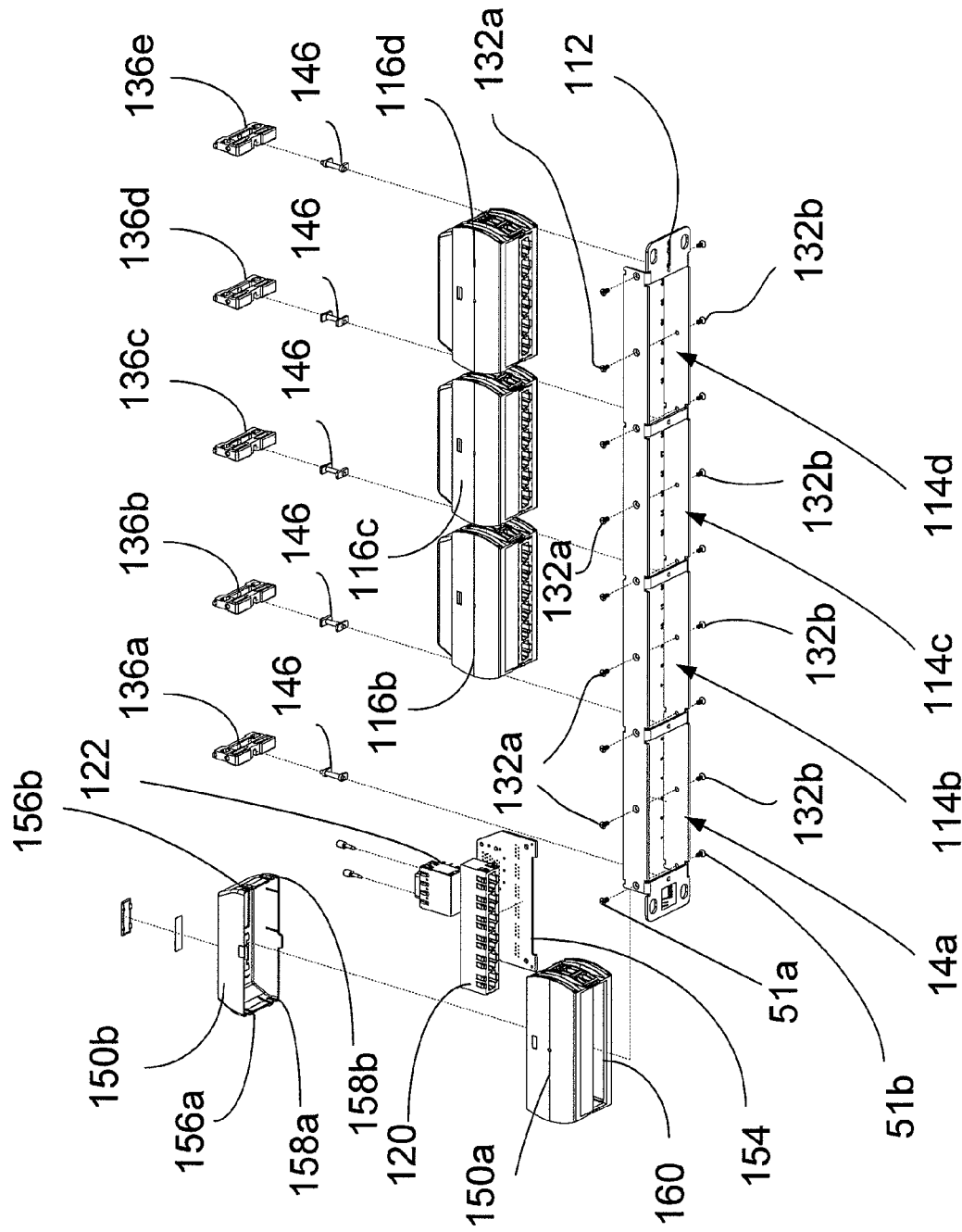
FIG. 28 is a partially exploded front perspective view of the patch panel shown in FIG. 18.
Figure 29:
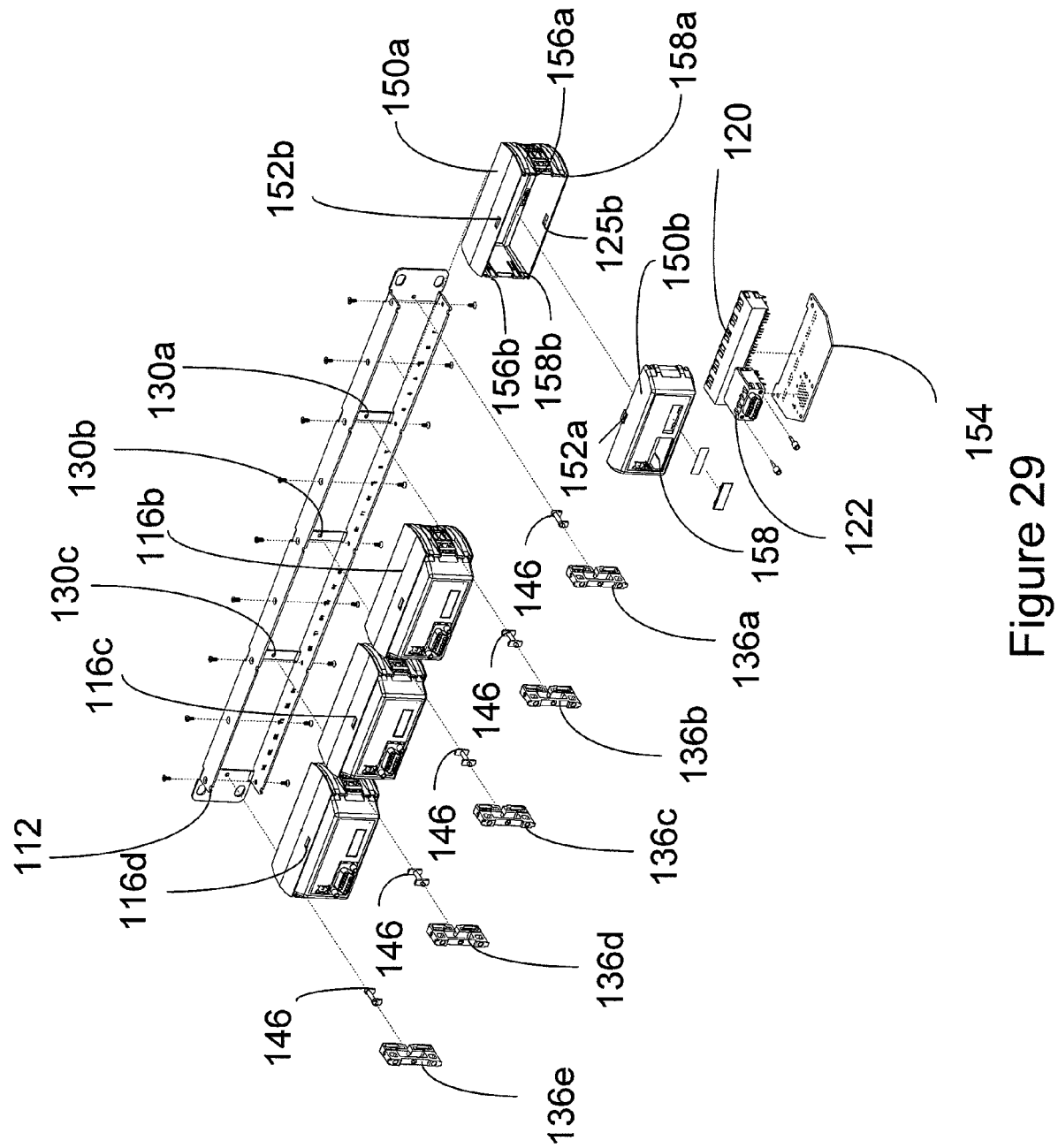
FIG. 29 is a partially exploded back perspective view of the patch panel shown in FIG. 18.

As particularly shown in FIGS. 28 and 29, the frame member 112 includes an upper elongate plate 128a and a lower elongate plate 128b arranged in parallel and separated by dividers 130a, 130b, 130c. The frame member is preferably formed of one piece of metal that has been pressed into shape so that the dividers 130a, 130b, 130c are connected integrally with common sides of the upper and lowers plates 128a, 128b. Each connector module mount 114a, 114b, 114c, 114d is formed between the upper and lower plates 128a, 128b and adjacent dividers 130a, 130b, 130c of the frame member 112. The connector module mounts 114a, 114b, 114c, 114d are of suitable size and shape to receive connector modules 116a, 116b, 116c, 116d in positions such that body portions of the module 116a, 116b, 116c, 116d are seated between the upper and lower plates 128a, 128b. The modules 116a, 116b, 116c, 116d are coupled to the mounts 114a, 114b, 114c, 114d by pins 132a, 132b extending through opposite sides of the upper and lower plates 128a, 128b. The pins 132a, 132b engage each module 116a, 116b, 116c, 116d in a manner that facilitates at least partial rotation about an axis defined therebetween. Alternatively, each connector module 116a, 116b, 116c, 116d is coupled to its respective mount 114a, 114b, 114c, 114d by any other suitable means that permits them to be arranged in a number of different positions about an axis of rotation.

Figure 24:
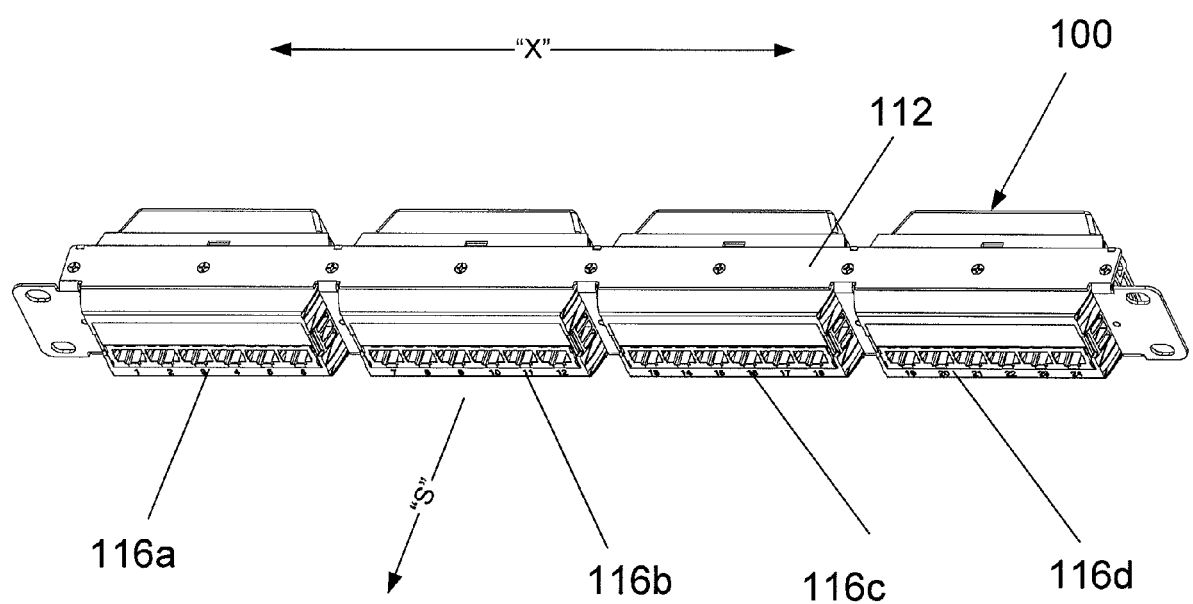
FIG. 24 is a front perspective view of the patch panel shown in FIG. 18.
Figure 25:
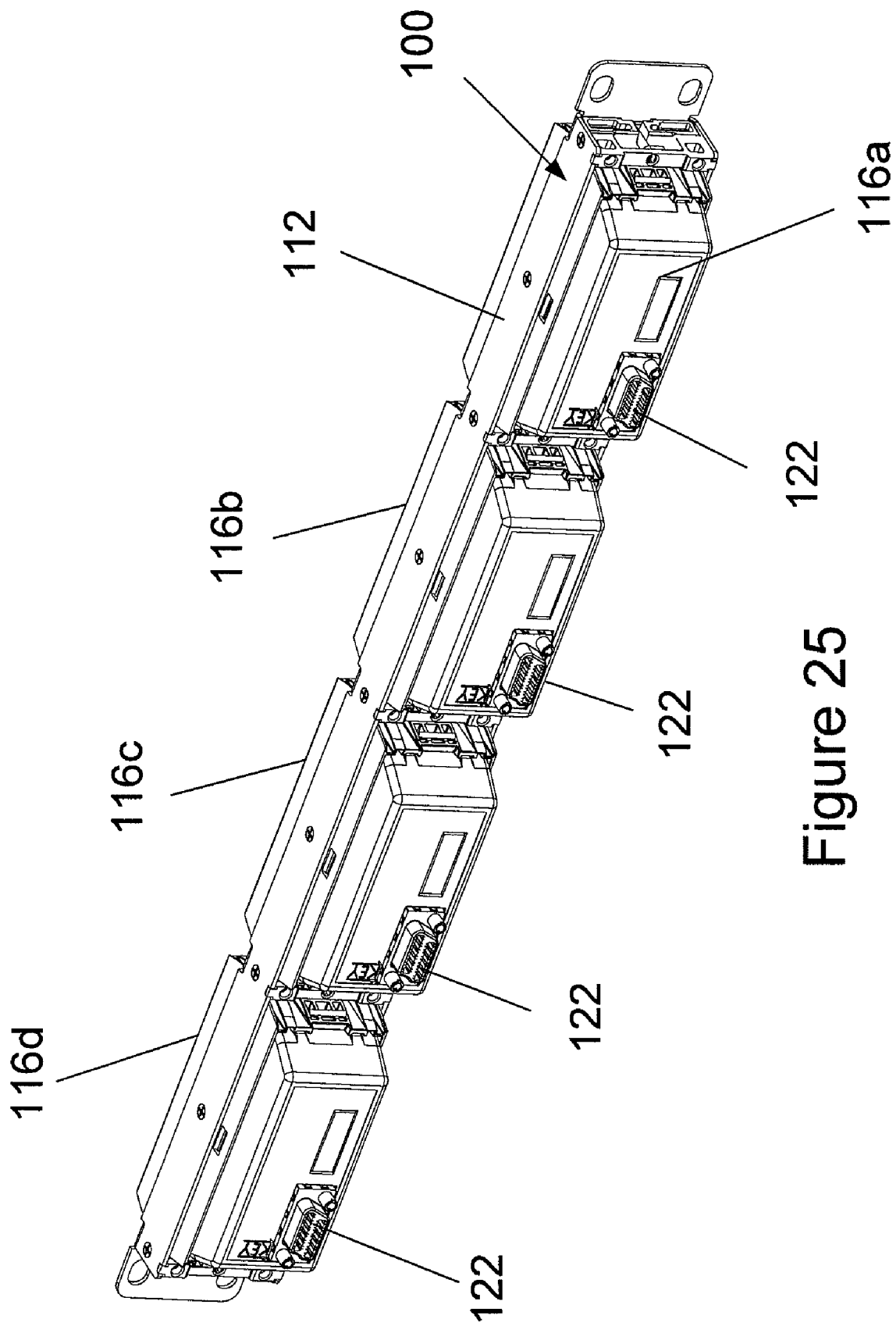
FIG. 25 is a back perspective view of the patch panel shown in FIG. 18.
Figure 26:
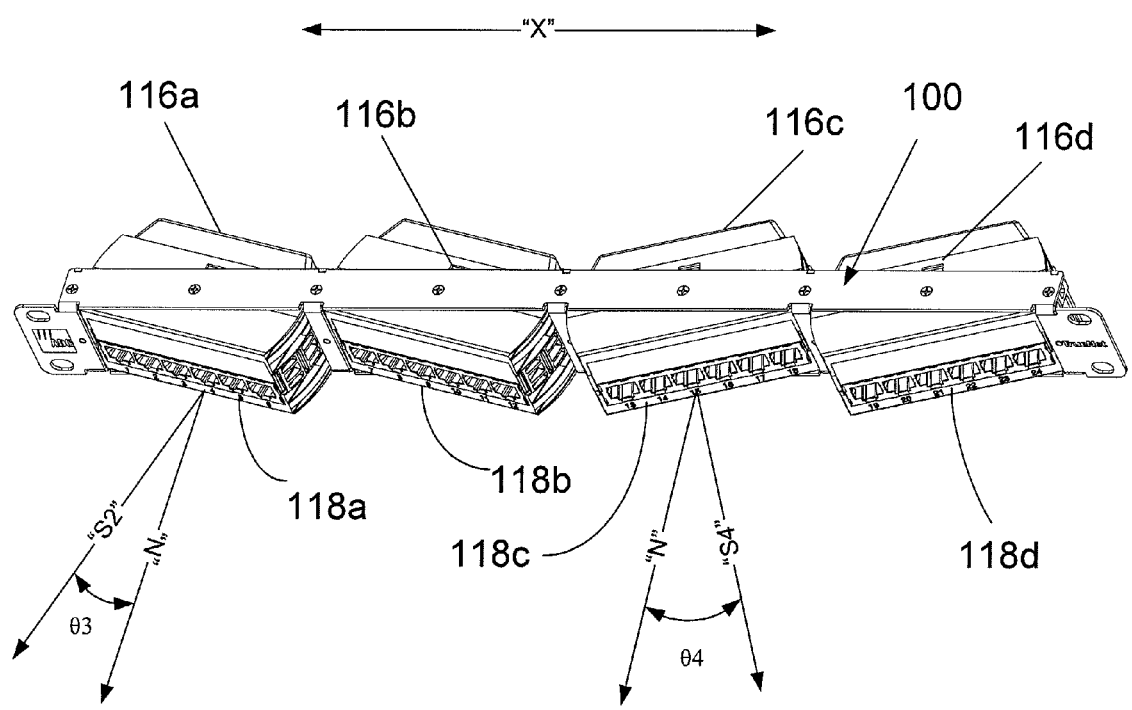
FIG. 26 is a front perspective view of the patch panel shown in FIG. 18 arranged in another condition of use.
Figure 27:
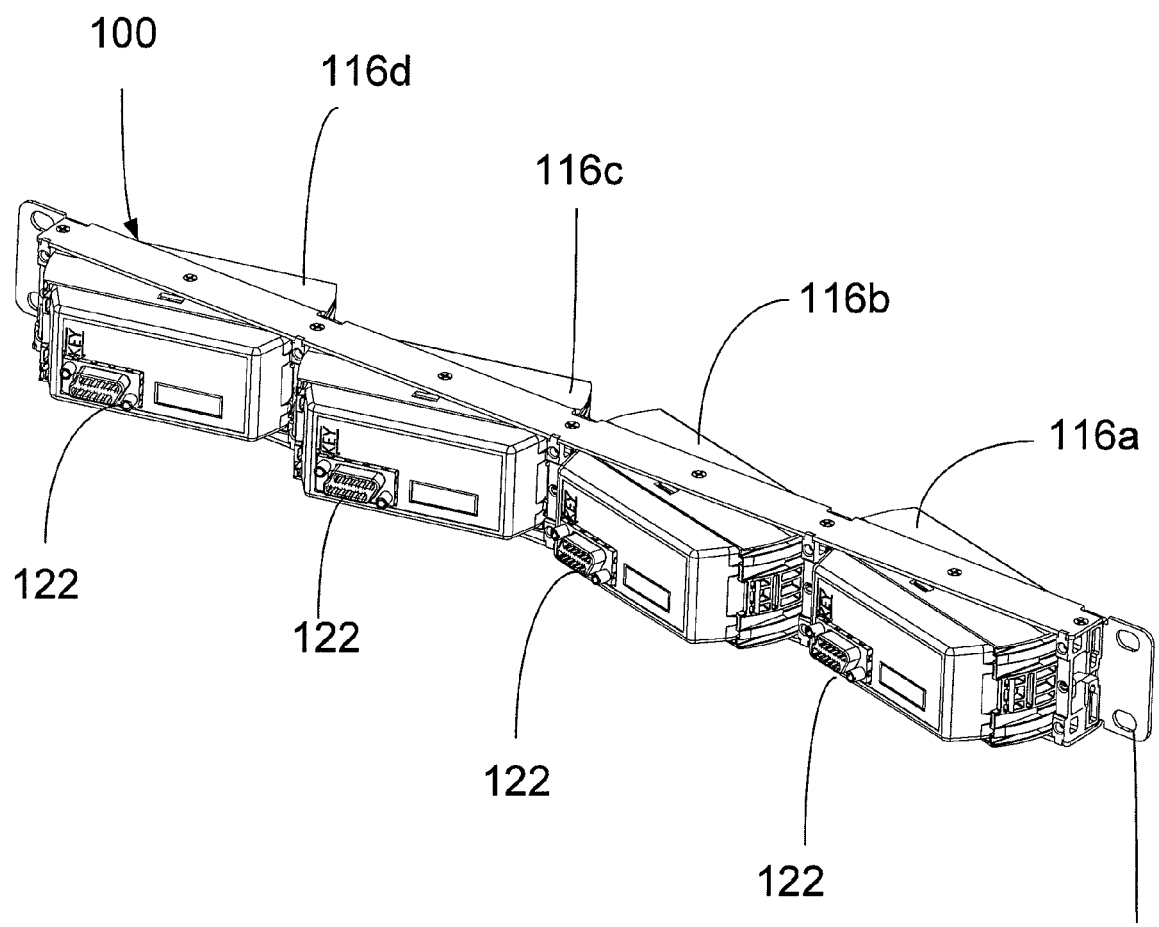
FIG. 27 is a back perspective view of the patch panel shown in FIG. 26.

In the above-described arrangement, each module 116a, 116b, 116c, 116d can be arranged in the manner shown in FIG. 24, where the first side 118 is opens in a direction "S" normal to a direction of extent "X" of the frame member 112. The modules 116a, 116b, 116c, 116d can also be arranged like the first module 116a shown in FIG. 26, where the first side 118a is opens in a direction "$S_3$" that is $\theta_3$ degrees to a direction "N" normal to the direction of extent "X" of the frame member 112. $\theta_3$ is preferably fifteen degrees, for example. Similarly, modules 116a, 116b, 116c, 116d can also be arranged like the third module 116c shown in FIG. 26 so the first side 118c is opens in a direction "$S_4$" that is $\theta_4$ degrees to a direction "N" normal to the direction of extent "X" of the frame member 12. $\theta_4$ is preferably fifteen degrees, for example.

The angle of the modules 116a, 116b, 116c, 116d with respect to the direction of extent "X" of the frame member 112 provides strain relief so as to help prevent cable damage and/or loss of cable performance. The cable positioning provided by the angled connector modules 116a, 116b, 116c, 116d helps reduce the likelihood of falling below the minimum bend radius of the cable as each cable travels to other jacks or other equipment. Such strain relief is advantageous over a perpendicular mounting of the connector plug relative to the cable pathway.

As particularly shown in FIGS. 28 and 29, the patch panel 100 includes five locking devices 136a, 136b, 136c, 136d, 136e which are adapted to hold secure the connector modules 116a, 116b, 116c, 116d in fixed positions with respect to their axes of rotation. Each locking device 136a, 136b, 136c, 136d, 136e is adapted to be fastened to a divider 130a, 130b, 130c or an end section of the frame member 112. As particularly shown in FIGS. 22 and 23, the locking devices 136a, 136b, 136c, 136d, 136e are shaped to receive and engage locking surfaces 138 of side sections 140 of the connector modules 116a, 116b, 116c, 116d. Each locking surface 138 includes vertical and horizontal channels 142 shaped to receive a flange 144 of the locking device 136.

To position the modules 116a, 116b, 116c, 116c in a preferred arrangement, the following steps are performed:
1. Unscrew the locking devices 136a, 136b, 136c, 136d, 136e from their current position;
2. Rotate modules 116a, 116b, 116c, 116d about respective axes to desired positions;
3. Screw locking devices back into position 136a, 136b, 136c, 136d, 136e ensuring that the flanges 144 are seated in the corresponding channels 142 of the modules 116a, 116b, 116c, 116d.

The modules 116a, 116b, 116c, 116c are held in position by way of frictional engagement between the channels 142 and the flanges 144 of the locking devices 136a, 136b, 136c, 136d, 136e. As such, the arrangement of the horizontal and vertical channels 142 determines the permissible positions of rotation about the axes. Alternatively, the locking devices 136a, 136b, 136c, 136d, 136e are adapted to engage the modules 116a, 116b, 116c, 116d in any suitable manner that facilitates securing them in fixed positions of rotation about their axes.

The locking devices 136a, 136b, 136c, 136d, 136e include locking pins 146, and brackets 148 mountable to the frame 112. Each locking pin 146 includes a shaft, two spaced apart tabs a first tool engageable end, and an opposite end. Each tab has two ends extending in opposite directions. One of the ends is received in hole of a corresponding divider 130a, 130b, 130c. Tool engageable end is received in an aperture of the bracket 148. Bracket 148 is mounted to upper and lower plates 128a, 128b of the frame 112 with two fasteners 151a, 151b. Once brackets 148 are mounted to frame 112, locking pin 146 is rotatable between an unlocked position, and a locked position. The unlocked position is where shaft is rotated 90 degrees about its longitudinal axis, such as with a flathead screwdriver received in tool engageable end. Examples of locking devices 136a, 136b, 136c, 136d, 136e can be found, for example, in U.S. Pat. No. 7,244,144.

The patch panel 100 is useable in both cross-connect systems, and in inter-connect systems, as desired. Providing strain relief so as to not fall below minimum bend radii is also an issue with fiberoptic transmission cables. The telecommunications patch panel 100 of the present invention is also useful in fiber applications with appropriately configured fiberoptic connectors.

As particularly shown in FIGS. 28 and 29, each connector module 116 includes a housing 150, formed in first and second parts 150a, 150b coupled together by male and female snap lock clips 152a, 152b. The housing 150 encapsulates a printed circuit board 154 having a plurality of RJ45 connector jacks 120 and a MINI RJ21 connector jack 122 electrically coupled thereto. The printed circuit board 154 is functionally equivalent to each one of the printed circuit boards 154a, 154b. The RJ45 jacks 120 are arranged as a linear array along an edge of the printed circuit board 154. The MINI RJ21 jack 122 is arranged towards a corner of the printed circuit board 154, opposite the array of RJ45 jacks 120. The external interface of the MINI RJ21 jack 122 opens in an opposite direction to the external interfaces of the RJ45 jacks 120. Both the RJ45 jacks 120 and the MINI RJ21 jack 122 are arranged on the same side of the printed circuit board 154.

The first and second parts 150a, 150b of the housing 150 include top and bottom pairs of channels 156a, 156b and 158a, 156b formed in the internal walls that are shaped to receive side sections of the printed circuit board 154. The pairs of channels 156a, 156b and 158a, 158b act to secure the printed circuit board 154 in one of two fixed positions when the parts 150a, 150b of the housing 150 are fitted together. When so arranged, the array of RJ45 connectors 120 of each printed circuit board 154a, 154b are seated for use in the face plate 160 and the MINI RJ21 jacks 122 are seated in corresponding apertures 158 of the second part 154b of the housing 150.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A telecommunications patch panel comprising:
   a frame member including a plurality of connector module mounts; and
   a plurality of connector modules, each being coupled to one of said mounts in one of a plurality of positions about an axis of rotation,
   wherein a first side of each connector module of said modules includes a plurality of first connector jacks in electrical communication with a single second connector jack by electric contacts of a first printed circuit board, the second connector jack being coupled to an opposite facing second side of the module;
   wherein the first side of each connector module includes another plurality of first connector jacks in electrical communication with another single second connector jack coupled to the opposite facing second side of the module; and
   wherein said another plurality of first connector jacks of each connector module is electrically connected to said another second connector jack by electric contacts of a second printed circuit board.

2. The patch panel claimed in claim 1, wherein the plurality of first connector jacks of each connector module comprises a linear array of RJ45 connector jacks.

3. The patch panel claimed in claim 1, wherein the second connector jack of each connector module is a MINI RJ21 connector jack.

4. The patch panel claimed in claim 1, wherein the first printed circuit board includes four layers.

5. The patch panel claimed in claim 1, wherein components of the first printed circuit board are located on only one side of the first printed circuit board.

6. The patch panel as claimed in claim 1, wherein the first printed circuit board is mounted horizontally.

7. The patch panel claimed in claim 1, wherein each connector module includes a housing shaped to encase the first printed circuit board.

8. The patch panel claimed in claim 7, wherein the housing of each connector module is shaped for at least partial rotation about an axis when seated in the mount.

9. The patch panel claimed in claim 1, wherein the first connector jacks are coupled to a common edge of the first printed circuit board.

10. The patch panel claimed in claim 9, wherein the second connector jack is coupled to a corner of the first printed circuit board remote from the first connector jacks.

11. The patch panel claimed in claim 1, wherein said another plurality of first connector jacks of each connector module comprises a linear array of RJ45 connector jacks.

12. The patch panel claimed in claim 1, wherein said another second connector jack of each connector module is a MINI RJ21 connector jack.

13. The patch panel claimed in claim 1, wherein the second printed circuit board includes four layers.

14. The patch panel claimed in claim 1, wherein components of the second printed circuit board are located on only one side of the board.

15. The patch panel claimed in claim 1, wherein each connector module includes a housing shaped to encase the first printed circuit board and the second printed circuit board.

16. The patch panel claimed in claim 15, wherein the housing of each connector module is shaped for at least partial rotation about an axis when seated in the respective mount.

17. The patch panel claimed in claim 1, further comprising a cable manager coupled to the frame member.

18. The patch panel claimed in claim 1, wherein the connector modules are each positionable in one of three positions with respect to the axis: a parallel position to the frame member, a first angled position relative to the frame member, and a second angled position relative to the frame member where the second angled position is in an opposite direction to the first angled position.

19. The patch panel claimed in claim 18, further comprising locks for securing the connector modules to the frame member in one of the said three positions.

20. The patch panel claimed in claim 1, wherein said another plurality of first connector jacks are coupled to a common edge of the second printed circuit board.

21. The patch panel claimed in claim 20, wherein said another second connector jack is coupled to a corner of the second printed circuit board remote from the first connector jacks.

22. The patch panel claimed in claim 21, wherein the first printed circuit board and the second printed circuit board are substantially identical.

23. The patch panel claimed in claim 22, wherein components of the first printed circuit board and components of the second printed circuit board face one another when assembled in the connector module.

24. The patch panel claimed in claim 23, wherein the first printed circuit board overlies the second printed circuit board when assembled in the connector module.

25. The patch panel claimed in claim 24, wherein the second connector jack of the first printed circuit board and said another second jack of the second printed circuit board are staggered when assembled in the connector module.

26. A telecommunications patch panel comprising:
a frame member including a plurality of connector module mounts;
multiple horizontal printed circuit boards mounted in vertically spaced relation; and
a plurality of connector modules, each being coupled to one of said mounts in one of a plurality of positions about an axis of rotation;
wherein a first side of each connector module of said modules includes a plurality of first connector jacks in electrical communication with a single second connector jack coupled to an opposite facing second side of the module;
wherein the second connector jack of each connector module is a MINI RJ21 connector jack; and
wherein the plurality of first connector jacks of each connector module is electrically connected to the second connector jack by electric contacts of one of the printed circuit boards.

27. A telecommunications patch panel comprising:
a frame member including a plurality of connector module mounts;
multiple opposed horizontal printed circuit boards where opposite printed circuit boards are inverted relative to each other; and
a plurality of connector modules, each being coupled to one of said mounts in one of a plurality of positions about an axis of rotation;
wherein a first side of each connector module of said modules includes a plurality of first connector jacks in electrical communication with a single second connector jack coupled to an opposite facing second side of the module;
wherein the second connector jack of each connector module is a MINI RJ21 connector jack; and
wherein the plurality of first connector jacks of each connector module is electrically connected to the second connector jack by electric contacts of one of at least one of the printed circuit boards.

28. A telecommunications patch panel comprising:
a frame member including a plurality of connector module mounts;
two opposed printed circuit boards inverted so that printed circuit board solder pins on the printed circuit boards are oriented outward; and
a plurality of connector modules, each being coupled to one of said mounts in one of a plurality of positions about an axis of rotation;
wherein a first side of each connector module of said modules includes a plurality of first connector jacks in electrical communication with a single second connector jack coupled to an opposite facing second side of the module; and
wherein the second connector jack of each connector module is a MINI RJ21 connector jack;
wherein the plurality of first connector jacks of each connector module is electrically connected to the second connector jack by electric contacts of one of the printed circuit boards.

29. A telecommunications patch panel comprising:
a frame member including a plurality of connector module mounts; and
a plurality of connector modules, each being coupled to one of said mounts in one of a plurality of positions about an axis of rotation,
wherein a first side of each connector module of said modules includes a plurality of first connector jacks in electrical communication with a single second connector jack coupled to an opposite facing second side of the module; and
wherein the connector modules are each positionable in one of three positions with respect to the axis: a parallel position to the frame member, a first angled position relative to the frame member, and a second angled position relative to the frame member where the second angled position is in an opposite direction to the first angled position.

30. The patch panel claimed in claim 29, further comprising locks for securing the connector modules to the frame member in one of the said three positions.

* * * * *

UNITED STATES PATENT AND TRADEMARK OFFICE
CERTIFICATE OF CORRECTION

| | | |
|---|---|---|
| PATENT NO. | : 7,901,236 B2 | Page 1 of 1 |
| APPLICATION NO. | : 12/130183 | |
| DATED | : March 8, 2011 | |
| INVENTOR(S) | :Patchett | |

It is certified that error appears in the above-identified patent and that said Letters Patent is hereby corrected as shown below:

Col. 1, line 63: "a plurality of first of connector jacks" should read --a plurality of first connector jacks--

Signed and Sealed this
Twentieth Day of September, 2011

David J. Kappos
*Director of the United States Patent and Trademark Office*